(12) United States Patent
Ikenaka

(10) Patent No.: US 7,190,658 B2
(45) Date of Patent: Mar. 13, 2007

(54) OPTICAL ELEMENT HAVING A PLURALITY OF RING-SHAPED ZONES

(75) Inventor: Kiyono Ikenaka, Hachioji (JP)

(73) Assignee: Konica Corporation, Tokyo (JP)

( * ) Notice: Subject to any disclaimer, the term of this patent is extended or adjusted under 35 U.S.C. 154(b) by 773 days.

(21) Appl. No.: 10/321,566

(22) Filed: Dec. 18, 2002

(65) Prior Publication Data
US 2003/0133195 A1  Jul. 17, 2003

(30) Foreign Application Priority Data
Dec. 21, 2001  (JP) .............................. 2001/389980

(51) Int. Cl.
*G11B 7/135* (2006.01)
*G02B 27/10* (2006.01)
(52) U.S. Cl. ............................ 369/112.13; 369/112.23; 359/719
(58) Field of Classification Search ................ 359/719; 369/112.26, 112.08, 112.13, 112.2, 112.23, 369/112.24
See application file for complete search history.

(56) References Cited

U.S. PATENT DOCUMENTS

| 4,810,046 A | * | 3/1989 | Yamagishi et al. ........... 359/18 |
| 4,815,058 A | * | 3/1989 | Nakamura et al. ....... 369/44.23 |
| 5,757,758 A | * | 5/1998 | Yagi et al. ............. 369/112.25 |
| 5,838,480 A | * | 11/1998 | McIntyre et al. ........... 359/205 |
| 5,926,450 A | * | 7/1999 | Braat ......................... 369/53.2 |
| 6,088,322 A | | 7/2000 | Broome et al. |
| 6,118,594 A | | 9/2000 | Maruyama |
| 6,134,055 A | * | 10/2000 | Koike ......................... 359/724 |
| 6,594,222 B2 | * | 7/2003 | Maruyama ............. 369/112.26 |
| 6,738,323 B1 | * | 5/2004 | Imanishi et al. ......... 369/44.32 |

FOREIGN PATENT DOCUMENTS

WO    WO 01/48746 A1    7/2001

OTHER PUBLICATIONS

European Search Report mailed May 23, 2005.

* cited by examiner

*Primary Examiner*—Andrea Wellington
*Assistant Examiner*—Peter Vincent Agustin
(74) *Attorney, Agent, or Firm*—Finnegan, Henderson, Farabow, Garrett & Dunner, L.L.P.

(57) ABSTRACT

An optical element-for use in an optical pickup apparatus for converging a light flux onto an information recording plane of an optical information recording medium, is provided with an optical path difference providing section divided coaxially around an optical axis so as to form a plurality of ring-shaped zones; and a refracting section optimizing a spherical aberration of a converged light spot of a light flux which has the operating reference wavelength $\lambda_0$ and is converged onto the information recording plane. The optical element converges an incident light flux having the operating reference wavelength $\lambda_0$ onto the information recording plane with almost no aberration, and the following formula is satisfied: $|\Delta f_B(\lambda-\lambda_0)|<2000$

37 Claims, 8 Drawing Sheets

– – – – – OPTICAL PATH OF LIGHT RAY BY REFRACTIVE FUNCTION
———— OPTICAL PATH OF LIGHT RAY BY REFRACTIVE FUNCTION AND OPTICAL PATH DIFFERENCE PROVIDING FUNCTION

- - - - - OPTICAL PATH OF LIGHT RAY BY REFRACTIVE FUNCTION
———— OPTICAL PATH OF LIGHT RAY BY REFRACTIVE FUNCTION AND OPTICAL PATH DIFFERENCE PROVIDING FUNCTION

Δψk(λ) : CHANGE AMOUNT OF PHASE DIFFERENCE PROVIDING AMOUNT OF k-th RING-SHAPED ZONE TO THAT OF FIRST RING-SHAPED ZONE

- - - - - - : LENS TO MAKE AN INCIDENT LIGHT FLUX HAVING AN OPERATING REFERENCE WAVELENGTH λ0 TO BE ALMOST NO ABERRATION

———— : MULTI RING-SHAPED ZONE PHASE DIFFERENCE LENS

———▲——— BASIC ASPHERICAL SURFACE LENS

———○——— MULTI-RING-SHAPED ZONE PHASE DIFFERENCE LENS

OPTICAL ELEMENT HAVING A PLURALITY OF RING-SHAPED ZONES

BACKGROUND OF THE INVENTION

The present invention relates to an optical pickup apparatus by which a light flux is converged onto an information recording surface of an optical information recording medium, and to an optical element (lens) used for the optical pickup apparatus.

There have been developed optical pickup devices which are used for recording data on or reproducing data from optical disks (optical information recording media) such as MO, CD and DVD, and they are used for various purposes.

In these optical pickup devices, there is used a light flux (laser light flux) whose wave front is trued up uniformly.

In the case of an optical disk of a photomagnetic recording type including MO, an optical disk of an organic dye recording type including DVD-R, and of an optical disk of a phase change recording type including DVD-RW, energy density (power) of a laser beam is enhanced by increasing an amount of electric current to be supplied to a laser oscillator, when writing data, and energy density of a laser beam is lowered by decreasing an amount of electric current to be supplied to a laser oscillator, when reading data.

For example, when writing data in MO, a magnetic layer of MO is irradiated with a laser beam until the temperature of the magnetic layer is raised up to Curie point of 150° C.–300° C. so that the condition under which the data can be rewritten may be created. If the magnetic force is given to this region by a bias magnet, data can be rewritten.

In the operations for writing MO, erasing operations, writing operations and verifying operations are carried out within a period of time in which the disk makes three turns.

In the first turn of the disk, the bias magnet is brought near to the reverse side of the MO disk that is rotating at high speed and, at the same time, the sector on which the data are written is irradiated by a strong laser light flux to raise temperature so that the direction of magnetization may be uniformed. This is the erasing operation which means that data of zero are written entirely.

In the second turn of the disk, the direction of the bias magnet is reversed, and a strong laser light flux is irradiated intermittently only on the location where data of 1 are written to raise temperature so that the direction of magnetization may be changed.

Then, in the third turn of the disk, a weak laser light flux is irradiated on the magnetic layer, and its reflected light is checked in term of an inclination angle, and thereby, written data are read to confirm whether the data are written correctly or not.

When writing data in DVD-RW, a strong laser light flux is irradiated on the recording layer of DVD-RW, and when temperature of the recording layer is raised up to 400° C., there is created the state of crystal wherein molecules on the recording layer are arranged in the same direction. Further, if the temperature is raised up to 600° C. or higher by irradiating stronger laser light flux, the recording layer is melted, and molecules are scattered in all directions, and after that, when the disk rotates and the laser light flux stops irradiating, resulting in the fall of temperature, the recording layer is fixed to be in the amorphous state. Since the reflectance for light on the section in the crystallized state is different from that on the section in the amorphous state, written data are read by investigating the intensity of the reflected light by irradiating the disk with a weak laser light flux.

On the optical disk on which data can be written as stated above, such as MO and DVD-RW, data reading and data writing are repeated alternatively. At the moment when the state of reading is switched to the state of writing, the power of the laser light flux emitted from the laser oscillator rises, causing a wavelength of the laser light flux to become long instantaneously ("mode hop").

When the wavelength of the laser light flux is long, a position of the light-converged light spot formed on the optical axis is moved, by dispersion property in a material of lens, to be far from an objective lens ("axial chromatic aberration"). Namely, the position of the light-converged light spot is deviated from the recording surface of the optical disk, causing a fear that errors may occur when information is written on the optical disk.

A wavelength of a laser light flux used for MO is 600–700 nm, and a variation of the wavelength caused by mode hop is about a few tenth nm. It is necessary to correct axial chromatic aberration on the wavelength variation of this level.

A high density DVD (HD-DVD) having recording density that is higher than that in DVD available on the market and an optical pickup device for the high density DVD are developed presently. A wavelength of a laser light flux used for HD-DVD is 400–500 nm, and a variation of the wavelength caused by mode hop is about a few nm. Since a wavelength of a laser light flux used for HD-DVD is shorter than that of a laser light flux used for MO, the axial chromatic aberration turns out to be great. Therefore, the necessity for correcting the axial chromatic aberration is higher than that for correcting MO.

SUMMARY OF THE INVENTION

An object of the present invention is to provide an optical pickup apparatus and an optical element for use in the optical pickup apparatus by which, even if mode hopping on which a wavelength of a laser light flux changes momentarily when the reading condition for an optical information recording medium is shifted to the writing condition for an optical information recording medium occurs with high frequency, defocus due to the mode hopping and an error at the time of writing the data onto the optical information recording medium can be prevented, and an optical element used for the optical pickup apparatus.

Initially, the structure of the present invention to attain the above object will be described below.

Item 1. An optical pickup apparatus by which the light flux is converged onto an information recording surface of an optical information recording medium, which is characterized in that: the optical pickup apparatus has the first optical element having an optical path difference providing function which is arranged on the optical axis in the optical system of this optical pickup apparatus, and divided into a plurality of ring-shaped zones by concentric circles around the optical axis, and each of these ring-shaped zones is formed so that it has respectively different thickness in the optical axis direction, and by which the optical path length of the light ray passing certain one ring-shaped zone is lengthened more than the optical path length of the light ray passing another ring-shaped zone which adjoins this ring-shaped zone and is closer to the optical axis than this ring-shaped zone, by almost the integer times of the operating reference wavelength $\lambda_0$; and the second optical element having a refractive function which is arranged on the optical axis of the optical system and by which the spherical aberration of the converged light spot formed on the information recording surface when the light flux of the operating reference wavelength $\lambda_0$ comes to be incident is made optimum; and wherein an incident light flux having the operating reference wavelength $\lambda_0$ is converged on the information recording surface with almost no aberration, and when a light flux having an operating wavelength $\lambda$ different from the operating reference wavelength $\lambda_0$ ($|\lambda-\lambda_0|<1$ [nm]) comes to be incident, a paraxial chromatic aberration (a longitudinal chromatic aberration) is corrected.

Herein, the first and second optical elements are respectively a lens made of a material having a prescribed refractive index such as a plastic and a glass. Further, the term "optimum" described herein means that a aberration of a light ray is almost no aberration (a variation range of a longitudinal aspherical aberration is 0.01 mm or less).

Further, "about integer times of the operating reference wavelength $\lambda_0$ (a value obtained by multiplying the operating reference wavelength $\lambda_0$ with an integer)" means, when the optical path difference providing amount is $\Delta L$, and k is an arbitrary integer, the range of $(k-0.2)\lambda_0 \leq \Delta L \leq (k+0.2)\lambda_0$. Further, "converged onto the information recording surface almost without aberration" means "not larger than $0.030\lambda$ rms".

According to the structure described in Item 1 since an incident light flux having the operating reference wavelength $\lambda_0$ is converged on the information recording surface with almost no aberration, and when a light flux having an operating wavelength $\lambda$ different from the operating reference wavelength $\lambda_0$ ($|\lambda-\lambda_0|<1$ [nm]) comes to be incident, since a paraxial chromatic aberration (a longitudinal chromatic aberration) is corrected, even if the wavelength of an incident light flux varies from the operating reference wavelength $\lambda_0$ to an operating wavelength $\lambda$ different from the operating reference wavelength $\lambda_0$ ($|\lambda-\lambda_0|<1$ [nm]) due to mode hopping generated momentarily when the reading condition for an optical information recording medium is switched to the writing condition for an optical information recording medium, an error can be prevented to occur at the time of writing the data onto the optical information recording medium.

Item 2. An optical pickup apparatus by which the light flux is converged onto an information recording surface of an optical information recording medium, which is characterized in that: it has the first optical element having an optical path difference providing function which is arranged on the optical axis in the optical system of this optical pickup apparatus, and divided into a plurality of ring-shaped zones by concentric circles around the optical axis, and each of these ring-shaped zones is formed so that it has respectively different thickness in the optical axis direction, and by which the optical path length of the light ray passing certain one ring-shaped zone is lengthened more than the optical path length of the light ray passing another ring-shaped zone which adjoins this ring-shaped zone and is closer to the optical axis than this ring-shaped zone, by almost the integer times of the operating reference wavelength $\lambda_0$; and the second optical element having a refractive function which is arranged on the optical axis of the optical system and by which the spherical aberration of the converged light spot formed on the information recording surface when the light flux of the operating reference wavelength $\lambda_0$ comes to be incident is made optimum; and wherein an incident light flux having the operating reference wavelength $\lambda_0$ is converged on the information recording surface with almost no aberration, and the following formula is satisfied:

$|\Delta f_B/(\lambda-\lambda_0)|<2000$ where $\Delta f_B$ is a distance between a converged light spot formed by an incident light flux having an operating wavelength $\lambda$ different from the operating reference wavelength $\lambda_0$ ($|\lambda-\lambda_0|<1$ [nm]) and a converged light spot formed by an incident light flux having the operating reference wavelength $\lambda_0$.

Herein, the first and second optical elements are respectively a lens made of a material having a prescribed refractive index such as a plastic and a glass.

According to the structure described in Item 2 when a light flux having the operating reference wavelength $\lambda_0$ comes to be incident, no phase difference is provided by a optical path difference providing function of the fist optical element and the second optical element is designed such that an incident surface and an emitting surface are respectively an aspherical surface with which an aberration of a light ray becomes no aberration. Therefore, a light flux having passed through the first optical element and the second optical element is converged with almost no aberration.

When the light flux of the operating wavelength $\lambda$ different from the operating reference wavelength $\lambda_0$ ($|\lambda-\lambda_0|<1$ [nm]) comes to be incident, by the refractive function under the influence of the dispersion property in a material of the second optical element, the wave front aberration is generated at a position where a converged light spot becomes optimum with the operating reference wavelength $\lambda_0$.

The relationship of the phase difference providing amount $\Psi(\lambda_0)$ by the optical path difference providing function of the first optical element and the difference d of the thickness in the optical axis direction of the ring-shaped zone is, when n ($\lambda_0$) is the refractive index, and k is integer, expressed by the following expression:

$$\Psi(\lambda_0) = -\frac{2\pi(n(\lambda_0)-1)d}{\lambda_0} = 2\pi k \qquad \text{[Expression 1]}$$

The difference d of the thickness of the ring-shaped zone called herein means, as shown in FIG. 1, the difference of the thickness in the optical axis direction between the extension of a certain ring-shaped zone and the first ring-shaped zone including the optical axis. The first ring-shaped zone is expressed by the aspheric surface expression, and is extended according to the expression.

The changed amount $\Delta\Psi(\lambda)$ of the phase difference providing amount, by the case where the wavelength of the incident light flux is changed from the operating reference wavelength $\lambda_0$ to the operating wavelength $\lambda$, is expressed by the following expression, by assuming that the change of the refractive index of the second optical element due to variations of the wavelength is $\delta$.

$$\Delta\Psi(\lambda) = \Psi(\lambda_0)\left(-\frac{1}{\lambda_0} + \frac{\delta}{(n(\lambda_0)-1)}\right) \times (\lambda-\lambda_0) \qquad \text{[Expression 2]}$$

$$= k\left(-\frac{1}{\lambda_0} + \frac{\delta}{(n(\lambda_0)-1)}\right)\Delta\lambda$$

$$\left(\Delta\lambda = \lambda - \lambda_0, \delta = \frac{dn}{d\lambda}\right)$$

The above change amount is caused by both of a phase difference change amount due to the difference d in thickness of ring-shaped zones and a phase difference change amount due to color dispersion property of a refractive index of the first optical element.

If a thickness of ring-shaped zones is formed in the direction in which the changed amount $\Delta\Psi(\lambda)$ of the phase difference providing amount and the wave front aberration generated by the change of the refractive function due to the influence of the dispersion of the second optical element are negated each other, an optical path length of a light ray becomes longer as the distant from the optical axis becomes longer. Further, the difference d of the thickness of the ring-shaped zone and the inner diameter and outer diameter in the vertical direction to the optical axis of each ring-shaped zone are determined by the operating reference wavelength $\lambda_0$ of the target optical system, a material constituting the optical element, and the numerical aperture.

When a wavelength is varied from the operating reference wavelength $\lambda_0$ to an operating wavelength $\lambda$, if a variation $\Delta f_B$ of a position of a converged light spot formed on the optical axis is located in a range indicated in the following formula without correcting necessarily a wavefront aberration to be no aberration at the same position on the optical axis, a writing error for MO at the time of mode hopping can be prevented.

$$|\Delta f_B(\lambda-\lambda_0)|<2000 \quad (3)$$

The width of the position along the optical axis where the radius of the converged light spot in the geometrical optical view becomes ($\lambda_0/2NA$) or less is called a focal depth (a depth of focus) ($\lambda_0/2NA^2$). If the radius of the converged light spot is ($\lambda_0/2NA$) or less, the intensity of the converged light spot necessary for reading an optical disk can be obtained.

In an optical pickup apparatus of MO, since the operating reference wavelength $\lambda_0$ is almost 600 to 700 nm and numerical aperture NA is almost 0.5 to 0.6 the focal depth ($\lambda_0/2NA^2$) of the optical system is about $1.4\lambda_0$ to $2.0\lambda_0$. Further, a variation value $|\lambda-\lambda_0|$ of the wavelength when mode hopping occurs on the optical pickup apparatus of MO is a few tenth nm. Therefore, the formula (3) is satisfied and a variation value $\Delta f_B$ of the position of a converged light spot is made within a range of the half of the focal depth.

Item 3. In the optical pickup apparatus described in Item 2 the operating reference wavelength $\lambda_0$ satisfies the following formula:

$$600 \text{ nm}<\lambda_0<700 \text{ nm}$$

According to the structure described in Item 3 since the operating reference wavelength $\lambda_0$ satisfies the following formula: 600 nm<$\lambda_0$<700 nm, the effect similar to that obtained by the structure of Item 1 can be obtained for a laser light flux having a wavelength of 600 nm to 700 nm which is used for reading or writing data for MO.

Item 4. In the optical pickup apparatus described in Item 3 the number of ring-shaped zones formed on the first optical element is 3 to 30.

In the structure of Item 4 on the position of the converged light spot where wavefront aberration becomes the smallest when the operating reference wavelength $\lambda_0$ comes to be incident, a wavefront error caused by a refracting function when a wavelength is varied is increased as the numerical aperture becomes larger. The term "wavefront error" described herein means a difference between the deviation of the wavefront of a paraxial ray and the deviation of a wavefront of a light ray corresponding to a specific numerical aperture.

When the numerical aperture is small, the number of ring-shaped zones necessary for correcting the wave front error is almost equal to the result in which the maximum value of the wave front error is divided by the changed amount $\Delta\Psi(\lambda)$ of the phase difference providing amount.

By making the wave front aberration when the wavelength is changed at the position of the converged light spot at which the wave front aberration is minimum when the light flux of the operating reference wavelength $\lambda_0$ comes to be incident, to be within the range necessary for reading or writing the data onto the optical information recording medium, even when the number of ring-shaped zones is smaller than the number in which the maximum value of the wave front error is divided by the changed amount $\Delta\Psi(\lambda)$ of the phase difference providing amount, the reading error is not generated at the time of mode hopping. In order to conduct reading or writing data for MO, the number of ring-shaped zones is preferably 3 to 30. According to the structure of Item 4 the effect similar to that obtained by the structure of Item 3 can be obtained with regard to the number of the ring-shaped zones.

Further, generally, when the number of the ring-shaped zones becomes smaller, the wavefront aberration becomes larger. However, there is a merit that the optical element can be processed easily.

Item 5 In the optical pickup apparatus described in Item 3 or Item 4 the numerical aperture NA of the optical system is 0.65 or less.

According to the structure described in Item 5 since the numerical aperture NA of the optical system is 0.65 or less, the effect similar to that obtained by the structure of Item 2 and Item 3 can be obtained for the numerical aperture NA of 0.5 to 0.6 which is necessary for reading or writing data for MO.

Since the focal depth ($\lambda_0/2NA^2$) of the optical system is $1.2\lambda_0$ or more, when a variation rate $|(\lambda-\lambda_0)/\lambda_0|$ of the wavelength of an incident light flux into a optical system due to mode hopping satisfies the following formula, $$|(\lambda-\lambda_0)/\lambda_0|<5.9\times10^{-4} \quad (4)$$

the formula (3) is satisfied and a variation value $\Delta f_B$ of the position of a converged light spot is made within a range of the half of the focal depth.

In the case of MO, since the operating reference wavelength $\lambda_0$ is almost 600 to 700 nm and a variation value $|\lambda-\lambda_0|$ of the wavelength due to mode hopping is a few tenth nm, the formula (4) is almost satisfied and a writing error for MO due to mode hopping can be avoided.

Item 6. An optical pickup apparatus by which the light flux is converged onto an information recording surface of an optical information recording medium, which is characterized in that: it has the first optical element having an optical path difference providing function which is arranged on the optical axis in the optical system of this optical pickup apparatus, and divided into a plurality of ring-shaped zones by concentric circles around the optical axis, and each of these ring-shaped zones is formed so that it has respectively different thickness in the optical axis direction, and by which the optical path length of the light ray passing certain one ring-shaped zone is lengthened more than the optical path length of the light ray passing another ring-shaped zone which adjoins this ring-shaped zone and is closer to the optical axis than this ring-shaped zone, by almost the integer times of the operating reference wavelength $\lambda_0$; and the second optical element having a refractive function which is arranged on the optical axis of the optical system and by which the spherical aberration of the converged light spot formed on the information recording surface when the light flux of the operating reference wavelength $\lambda_0$ comes to be incident is made optimum; and wherein an incident light flux having the operating reference wavelength $\lambda_0$ is converged on the information recording surface with almost no aberration, and the following formula is satisfied:

$$|\Delta f_B/(\lambda-\lambda_0)|<150$$

where $\Delta f_B$ is a distance between a converged light spot formed by an incident light flux having an operating wavelength $\lambda$ different from the operating reference wavelength $\lambda_0$ ($|\lambda-\lambda_0|<2$ [nm]) and a converged light spot formed by an incident light flux having the operating reference wavelength $\lambda_0$.

According to the structure described in Item 6 when a light flux having the operating reference wavelength $\lambda_0$ comes to be incident, no phase difference is provided by a optical path difference providing function of the fist optical element and the second optical element is designed such that an incident surface and an emitting surface are respectively an aspherical surface with which an aberration of a light ray becomes no aberration. Therefore, a light flux having passed through the first optical element and the second optical element is converged with almost no aberration.

When the light flux of the operating wavelength $\lambda$ different from the operating reference wavelength $\lambda_0$ ($|\lambda-\lambda_0|<2$ [nm]) comes to be incident, by the refractive index under the influence of the dispersion of the second optical element, the wave front aberration is generated at a position where a converged light spot becomes optimum with the operating reference wavelength $\lambda_0$.

The relationship of the phase difference providing amount $\Psi(\lambda_0)$ by the optical path difference providing function of the first optical element and the difference d of the thickness in the optical axis direction of the ring-shaped zone is, when n ($\lambda_0$) is the refractive index, and k is integer, expressed by [Expression 1]

The changed amount $\Delta\Psi(\lambda)$ of the phase difference providing amount, by the case where the wavelength of the incident light flux is changed from the operating reference wavelength $\lambda_0$ to the operating wavelength $\lambda$, is expressed by [Expression 2] by assuming that the change of the refractive index of the second optical element due to variations of the wavelength is $\delta$. The above change amount is caused by both a phase difference change amount due to the difference d in thickness of ring-shaped zones and a phase difference change amount due to color dispersion property of a refractive index of the first optical element.

If a thickness of ring-shaped zones is formed in the direction in which the changed amount $\Delta\Psi(\lambda)$ of the phase difference providing amount and the wave front aberration generated by the change of the refractive function due to the influence of the dispersion property of the second optical element are negated each other, an optical path length of a light ray becomes longer as the distant from the optical axis becomes longer. Further, the difference d of the thickness of the ring-shaped zone and the inner diameter and outer diameter in the vertical direction to the optical axis of each ring-shaped zone are determined by the operating reference wavelength $\lambda_0$ of the target optical system, a material constituting the optical element, and the numerical aperture.

When a wavelength is varied from the operating reference wavelength $\lambda_0$ to an operating wavelength $\lambda$, if a variation $\Delta f_B$ of a position of a converged light spot formed on the optical axis is located in a range indicated in the following formula without correcting necessarily a wavefront aberration to be no aberration at the same position on the optical axis, a writing error for HD-DVD at the time of mode hopping can be prevented.

$$|\Delta f_B/(\lambda-\lambda_0)|<150 \qquad (5)$$

The width of the position along the optical axis where the radius of the converged light spot in the geometrical optical view becomes ($\lambda_0/2NA$) or less is called a focal depth ($\lambda_0/2NA^2$). If the radius of the converged light spot is ($\lambda_0/2NA$) or less, the intensity of the converged light spot necessary for reading an optical disk can be obtained.

In an optical pickup apparatus of HD-DVD, since the operating reference wavelength $\lambda_0$ is almost 400 to 500 nm and numerical aperture NA is almost 0.65 to 0.85 the focal depth ($\lambda_0/2NA^2$) of the optical system is about $0.69\lambda_0$ to $1.2\lambda_0$. Further, a variation value $|\lambda-\lambda_0|$ of the wavelength when mode hopping occurs on the optical pickup apparatus of HD-DVD is a few tenth nm. Therefore, the formula (5) is satisfied and a variation value $\Delta f_B$ of the position of a converged light spot is made within a range of the half of the focal depth.

Item 7. In the optical pickup apparatus described in Item 6 the operating reference wavelength $\lambda_0$ satisfies the following formula:

$$400 \text{ nm}<\lambda_0<500 \text{ nm}$$

According to the structure described in Item 7 since the operating reference wavelength $\lambda_0$ satisfies the following formula: 400 nm$<\lambda_0<$500 nm, the effect similar to that obtained by the structure of Item 6 can be obtained for a laser light flux having a wavelength of 400 nm to 500 nm which is used for reading or writing data for HD-DVD.

Item 8. In the optical pickup apparatus described in Item 7 the number of ring-shaped zones formed on the first optical element is 20 to 60.

In the structure of Item 8 on the position of the converged light spot where wavefront aberration becomes the smallest when the operating reference wavelength $\lambda_0$ comes to be incident, a wavefront error caused by a refracting function when a wavelength is varied is increased as the numerical aperture becomes larger. The term "wavefront error" described herein means a difference between the deviation of the wavefront of a paraxial ray and the deviation of a wavefront of a light ray corresponding to a specific numerical aperture.

When the numerical aperture is small, the number of ring-shaped zones necessary for correcting the wave front error is almost equal to the result in which the maximum value of the wave front error is divided by the changed amount $\Delta\Psi(\lambda)$ of the phase difference providing amount.

By making the wave front aberration when the wavelength is changed at the position of the converged light spot at which the wave front aberration is minimum when the light flux of the operating reference wavelength $\lambda_0$ comes to be incident, to be within the range necessary for reading or writing the data onto the optical information recording medium, even when the number of ring-shaped zones is smaller than the number in which the maximum value of the wave front error is divided by the changed amount $\Delta\Psi(\lambda)$ of the phase difference providing amount, the reading error is not generated at the time of mode hopping. In order to conduct reading or writing data for HD-DVD, the number of ring-shaped zones is preferably 20 to 60. According to the structure of Item 8 the effect similar to that obtained by the structure of Item 7 can be obtained with regard to the number of the ring-shaped zones.

Further, generally, when the number of the ring-shaped zones becomes smaller, the wavefront aberration becomes larger. However, there is a merit that the optical element can be processed easily.

Item 9. In the optical pickup apparatus described in Item 7 or Item 8 the numerical aperture NA of the optical system is 0.9 or less.

According to the structure described in Item 9 the effect similar to that obtained by the structure of Item 7 or Item 8 can be obtained, further, since the numerical aperture NA of the optical system is 0.9 or less, the effect similar to that obtained by the structure of Item 7 and Item 8 can be obtained for the numerical aperture NA of 0.65 to 0.85 which is necessary for reading or writing data for HD-DVD.

Since the focal depth $(\lambda_0/2NA^2)$ of the optical system is $0.62\lambda_0$ or more, when a variation rate $|(\lambda-\lambda_0)/\lambda_0|$ of the wavelength of an incident light flux into a optical system due to mode hopping satisfies the following formula, $$|(\lambda-\lambda_0)/\lambda_0| < 4.1 \times 10^{-3} \quad (6)$$

the formula (5) is satisfied and a variation value $\Delta f_B$ of the position of a converged light spot is made within a range of the half of the focal depth.

In the case of HD-DVD, since the operating reference wavelength $\lambda_0$ is almost 400 to 500 nm and a variation value $|\lambda-\lambda_0|$ of the wavelength due to mode hopping is a few tenth nm, the formula (6) is almost satisfied and a writing error for HD-DVD due to mode hopping can be avoided.

Item 10. An optical element for use in an optical pickup apparatus by which the light flux is converged onto an information recording surface of an optical information recording medium, which is characterized in that: it has an optical path difference providing function which is arranged on the optical axis in the optical system of this optical pickup apparatus, and divided into a plurality of ring-shaped zones by concentric circles around the optical axis, and each of these ring-shaped zones is formed so that it has respectively different thickness in the optical axis direction, and by which the optical path length of the light ray passing certain one ring-shaped zone is lengthened more than the optical path length of the light ray passing another ring-shaped zone which adjoins this ring-shaped zone and is closer to the optical axis than this ring-shaped zone, by almost the integer times of the operating reference wavelength $\lambda_0$; and a refracting function which is arranged on the optical axis of the optical system and by which the spherical aberration of the converged light spot formed on the information recording surface when the light flux of the operating reference wavelength $\lambda_0$ comes to be incident is made optimum; and wherein an incident light flux having the operating reference wavelength $\lambda_0$ is converged on the information recording surface with almost no aberration, and the following formula is satisfied:

$$|\Delta f_B/(\lambda-\lambda_0)| < 2000$$

where $\Delta f_B$ is a distance along the direction of the optical axis between a converged light spot formed by an incident light flux having an operating wavelength $\lambda$ different from the operating reference wavelength $\lambda_0$ ($|\lambda-\lambda_0| < 1$ [nm]) and a converged light spot formed by an incident light flux having the operating reference wavelength $\lambda_0$.

According to the structure described in Item 10, when a light flux having the operating reference wavelength $\lambda_0$ comes to be incident, a spherical aberration by a refracting function of the optical element is designed to be over-corrected (over). However, since the optical element has both of the refracting function and the optical path difference providing function, the effect similar to that in the case the thickness of the optical element substantially becomes thicker is caused. As shown in FIG. 1, in comparison with a light ray passing through an optical element provided with only the refracting function, when a light ray passes through an optical element provided with both of the refracting function and the optical path difference providing function, the length of an optical path of the light ray in the optical element becomes longer. As a result, the spherical aberration which is made "over" by the refracting function of the optical element is received the action to make "under" so that the spherical aberration becomes almost no aberration.

The term "under" called herein is reverse to "over" and means that a point at which an incident light flux intersects with the optical axis comes close to the optical element. However, the term "under" includes the case that locally an incident light flux intersects with the optical axis at a position far from the optical element in a partial region having a high numerical aperture.

With regard to the shape of the surface of the optical element described in Item 10 basically, the optical element having the refracting function and the optical path difference providing function may be made by simply shifting the shape of an aspherical surface having a refracting function by a distance corresponding to a optical path difference.

However, when a numerical aperture becomes large and a radius of curvature of the surface of an optical element becomes small, since the necessary to consider precisely an optical path length arises, there may be a case that the above function can not obtained only by shifting the shape of an aspherical surface having a refracting function by a distance corresponding to a optical path difference. In this case, by further changing the shape of the refractive surface having a refracting function, an optical element having both of the refracting function and the optical path difference providing function.

In this way, according to the structure of Item 10 the effect similar to that obtained by the structure of Item 2 can be obtained.

Item 11. In the optical element described in Item 10 the operating reference wavelength $\lambda_0$ satisfies the following formula:

$$600 \text{ nm} < \lambda_0 < 700 \text{ nm}$$

According to the structure described in Item 11 the effect similar to that obtained by the structure of Item 3 can be obtained.

Item 12. In the optical element described in Item 11 the number of ring-shaped zones formed on the first optical element is 3 to 30.

In the structure of Item 12 on the position of the converged light spot where wavefront aberration becomes the smallest when the operating reference wavelength $\lambda_0$ comes to be incident, a wavefront error caused by a refracting function when a wavelength is varied is increased as the numerical aperture becomes larger. The term "wavefront error" described herein means a difference between the deviation of the wavefront of a paraxial ray and the deviation of a wavefront of a light ray corresponding to a specific numerical aperture.

When the numerical aperture is small, the number of ring-shaped zones necessary for correcting the wave front error is almost equal to the result in which the maximum value of the wave front error is divided by the changed amount $\Delta\Psi(\lambda)$ of the phase difference providing amount. However, in the case that an optical element has a refracting function and an optical path difference providing function, particularly when a numerical aperture becomes larger, the deviation from the value becomes larger.

By making the wave front aberration when the wavelength is changed at the position of the converged light spot at which the wave front aberration is minimum when the light flux of the operating reference wavelength $\lambda_0$ comes to be incident, to be within the range necessary for reading or writing the data onto the optical information recording medium, even when the number of ring-shaped zones is smaller than the number in which the maximum value of the wave front error is divided by the changed amount $\Delta\Psi(\lambda)$ of the phase difference providing amount, the reading error is not generated at the time of mode hopping. In order to conduct reading or writing data for MO, the number of ring-shaped zones is preferably 3 to 30. According to the structure of Item 12 the effect similar to that obtained by the structure of Item 11 can be obtained with regard to the number of the ring-shaped zones.

Further, generally, when the number of the ring-shaped zones becomes smaller, the wavefront aberration becomes larger. However, there is a merit that the optical element can be processed easily.

Item 13. In the optical element described in Item 11 or Item 12 the numerical aperture NA of the optical system is 0.65 or less.

According to the structure described in Item 13 the effect similar to that obtained by the structure of Item 5 can be obtained.

Item 14. In the optical element described in Item 11 or Item 13 among the light flux, a distance between a position where a light ray having passed through at a position located farthest from the optical axis of the optical element intersects with the optical axis by the refracting function and a position where a paraxial ray intersects with the optical axis by the refracting function us 0.02 mm or less.

The term "a light ray having passed through at a position located farthest from the optical axis of the optical element" called herein means a light ray corresponding to the numerical aperture of the optical element.

According to the structure described in Item 14 the effect similar to that obtained by the structure of one of Item 11 to Item 13 can be obtained, and since a distance between a position where a light ray having passed through at a position located farthest from the optical axis of the optical element intersects with the optical axis by the refracting function and a position where a paraxial ray intersects with the optical axis by the refracting function us 0.02 mm or less, a light flux having an operating reference wavelength $\lambda_0$ is made to be no aberration by the refracting function and the optical path different providing function.

Item 15. An optical element for use in an optical pickup apparatus by which the light flux is converged onto an information recording surface of an optical information recording medium, which is characterized in that: it has an optical path difference providing function which is arranged on the optical axis in the optical system of this optical pickup apparatus, and divided into a plurality of ring-shaped zones by concentric circles around the optical axis, and each of these ring-shaped zones is formed so that it has respectively different thickness in the optical axis direction, and by which the optical path length of the light ray passing certain one ring-shaped zone is lengthened more than the optical path length of the light ray passing another ring-shaped zone which adjoins this ring-shaped zone and is closer to the optical axis than this ring-shaped zone, by almost the integer times of the operating reference wavelength $\lambda_0$; and a refractive function which is arranged on the optical axis of the optical system and by which the spherical aberration of the converged light spot formed on the information recording surface when the light flux of the operating reference wavelength $\lambda_0$ comes to be incident is made optimum; and wherein an incident light flux having the operating reference wavelength $\lambda_0$ is converged on the information recording surface with almost no aberration, and the following formula is satisfied:

$$|\Delta f_B/(\lambda-\lambda_0)|<150$$

where $\Delta f_B$ is a distance between a converged light spot formed by an incident light flux having an operating wavelength $\lambda$ different from the operating reference wavelength $\lambda_0$ ($|\lambda-\lambda_0|<2$ [nm]) and a converged light spot formed by an incident light flux having the operating reference wavelength $\lambda_0$.

According to the structure described in Item 15, when a light flux having the operating reference wavelength $\lambda_0$ comes to be incident, a spherical aberration by a refracting function of the optical element is designed to be over-corrected (over). However, since the optical element has both of the refracting function and the optical path difference providing function, the effect similar to that in the case the thickness of the optical element substantially becomes thicker is caused. As shown in FIG. 1, in comparison with a light ray passing through an optical element provided with only the refracting function, when a light ray passes through an optical element provided with both of the refracting function and the optical path difference providing function, the length of an optical path of the light ray in the optical element becomes longer. As a result, the spherical aberration which is made "over" by the refracting function of the optical element is corrected by the optical path difference providing function with the action to make "under" so that the spherical aberration becomes almost zero.

The term "under" called herein is reverse to "over" and means that a point at which an incident light flux intersects with the optical axis comes close to the optical element. However, the term "under" includes the case that locally an incident light flux intersects with the optical axis at a position far from the optical element in a partial region having a high numerical aperture.

With regard to the shape of the surface of the optical element described in Item 15 basically, the optical element having the refracting function and the optical path difference providing function may be made by simply shifting the shape of an aspherical surface having a refracting function by a distance corresponding to a optical path difference.

However, when a numerical aperture becomes large and a radius of curvature of the surface of an optical element becomes small, since the necessary to consider precisely an optical path length arises, there may be a case that the above function can not obtained only by shifting the shape of an aspherical surface having a refracting function by a distance corresponding to a optical path difference. In this case, by further changing the shape of the refractive surface performing a refracting function, an optical element having both of the refracting function and the optical path difference providing function.

In this way, according to the structure of Item 15 the effect similar to that obtained by the structure of Item 6 can be obtained.

Item 16. In the optical element described in Item 15 the operating reference wavelength $\lambda_0$ satisfies the following formula:

$$400 \text{ nm} < \lambda_0 < 500 \text{ nm}$$

According to the structure described in Item 16 the effect similar to that obtained by the structure of Item 7 can be obtained.

Item 17. In the optical element described in Item 16 the number of ring-shaped zones formed on the first optical element is 20 to 60.

In the structure of Item 17 on the position of the converged light spot where wavefront aberration becomes the smallest when the operating reference wavelength $\lambda_0$ comes to be incident, a wavefront error caused by a refracting function when a wavelength is varied is increased as the numerical aperture becomes larger. The term "wavefront error" described herein means a difference between the deviation of the wavefront of a paraxial ray and the deviation of a wavefront of a light ray corresponding to a specific numerical aperture.

When the numerical aperture is small, the number of ring-shaped zones necessary for correcting the wave front error is almost equal to the result in which the maximum value of the wave front error is divided by the changed amount $\Delta\Psi(\lambda)$ of the phase difference providing amount. However, in the case that an optical element has a refracting function and an optical path difference providing function, particularly when a numerical aperture becomes larger, the deviation from the value becomes larger.

By making the wave front aberration when the wavelength is changed at the position of the converged light spot at which the wave front aberration is minimum when the light flux of the operating reference wavelength $\lambda_0$ comes to be incident, to be within the range necessary for reading or writing the data onto the optical information recording medium, even when the number of ring-shaped zones is smaller than the number in which the maximum value of the wave front error is divided by the changed amount $\Delta\Psi(\lambda)$ of the phase difference providing amount, the reading error is not generated at the time of mode hopping. In order to read or write data in HD-DVD, the number of ring-shaped zones is preferably 3 to 30. According to the structure of Item 17 the effect similar to that obtained by the structure of Item 16 can be obtained with regard to the number of the ring-shaped zones.

Further, generally, when the number of the ring-shaped zones becomes smaller, the wavefront aberration becomes larger. However, there is a merit that the optical element can be processed easily.

Item 18. In the optical element described in Item 16 or Item 17 the numerical aperture NA of the optical system is 0.9 or less.

According to the structure described in Item 18 the effect similar to that obtained by the structure of Item 9 can be obtained.

Item 19. In the optical element described in one of Item 16 to Item 18 among the light flux, a distance between a position where a light ray having passed through at a position located farthest from the optical axis of the optical element intersects with the optical axis by the refracting function and a position where a paraxial ray intersects with the optical axis by the refracting function is 0.03 mm or less.

According to the structure described in Item 19 the effect similar to that obtained by the structure of one of Item 16 to Item 18 can be obtained, and since a distance between a position where a light ray having passed through at a position located farthest from the optical axis of the optical element intersects with the optical axis by the refracting function and a position where a paraxial ray intersects with the optical axis by the refracting function is 0.03 mm or less, a light flux having an operating reference wavelength $\lambda_0$ is made to be no aberration by the refracting function and the optical path different providing function.

Figure 1:
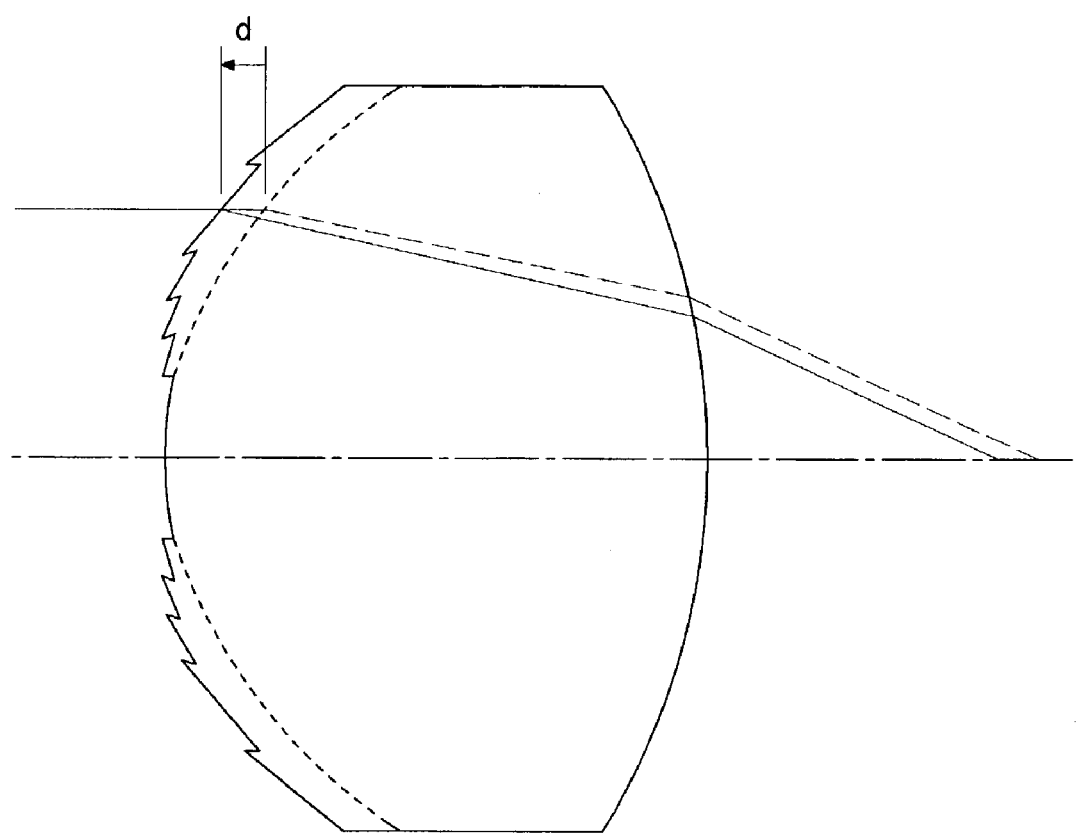
FIG. 1 is an outline view of the optical path of the light ray by the refracting function of the first optical element and the second optical element or the optical element according to the present invention, and the optical path of the light ray by the optical path difference providing function and the refractive function.

DETAILED DESCRIPTION OF THE PREFERRED EMBODIMENT (Embodiment of the Invention)

An optical pickup device of the invention and an embodiment of an optical element of the invention will be explained as follows, referring to the drawings.

Figure 2:
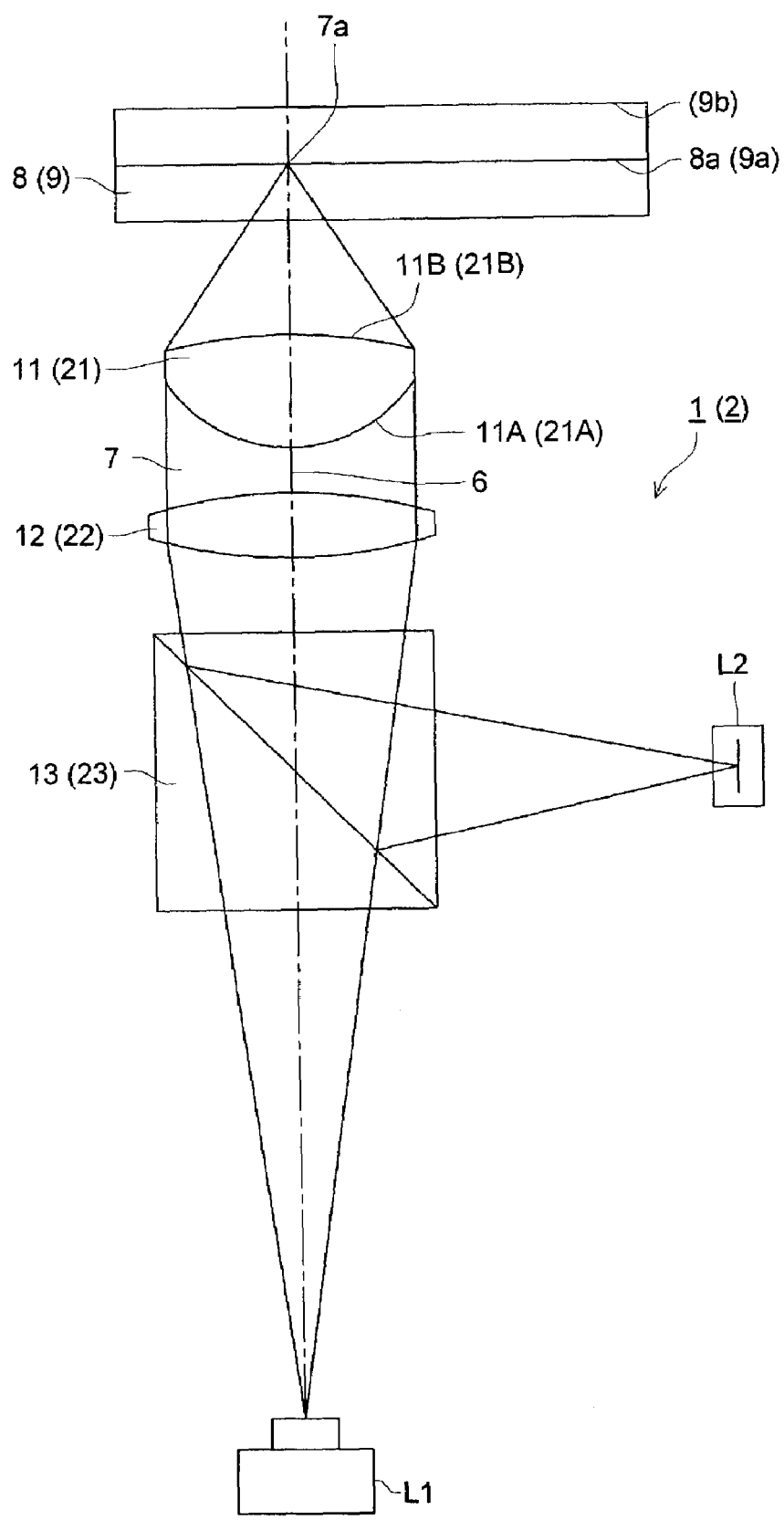
FIG. 2 is an outline view of the overall structure of an example of the optical pickup apparatus according to the present invention.

FIG. 2 is a schematic diagram of the overall structure of optical pickup devices 1 and 2 respectively of the first embodiment and the second embodiment which will be explained later.

Each of the optical pickup devices 1 and 2 respectively of the first embodiment and the second embodiment makes a laser light flux (light flux) having operating reference wavelength $\lambda_0$ of 685 nm or 405 nm emitted from each laser oscillator L1 to pass through collimator lenses 12 and 22 and multi-ring-shaped zone phase difference lenses 11 and 21 described later, then, converges on information recording surfaces 8a and 9a of MO 8 or HD-DVD 9 (optical information recording medium) on optical axis 6, to form a converged spot, and makes polarization beam splitter 13 to take in reflected light from information recording surface 8a or from reflection surface 9b of HD-DVD, to form a beam spot again on a light-receiving surface of detector L2.

Figure 3:
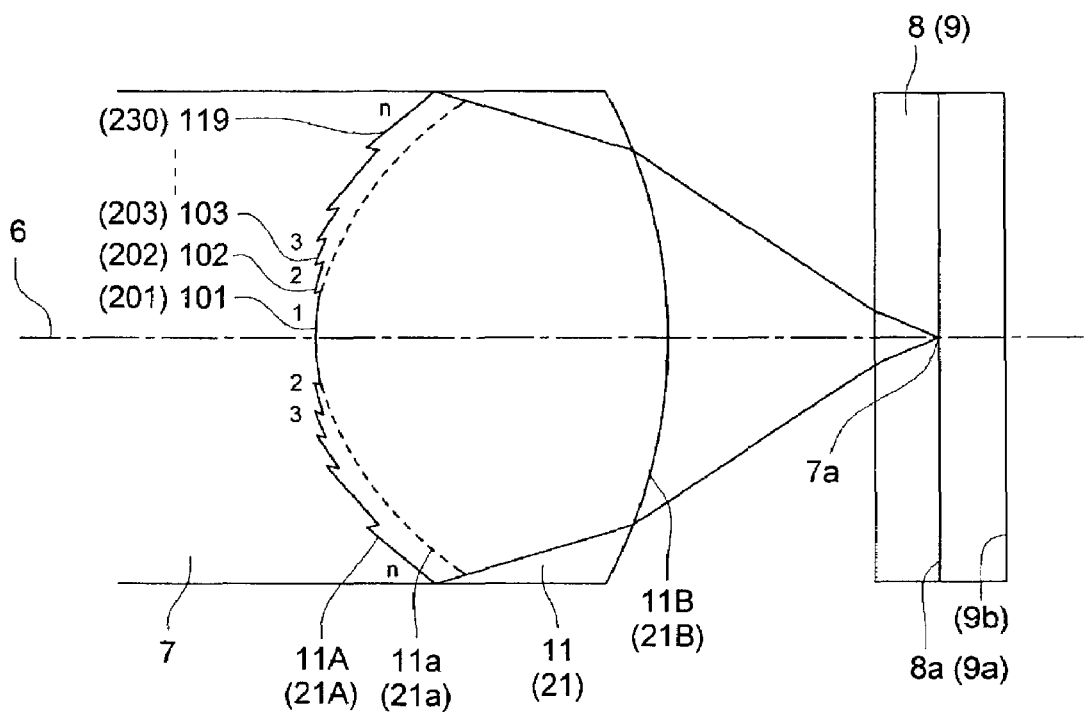
FIG. 3 is a side view showing the outline of an example of the first optical element and the second optical element or a multi ring-shaped zone phase difference lens as an optical element according to the present invention, in the optical pickup apparatus according to the present invention.
Figure 4:
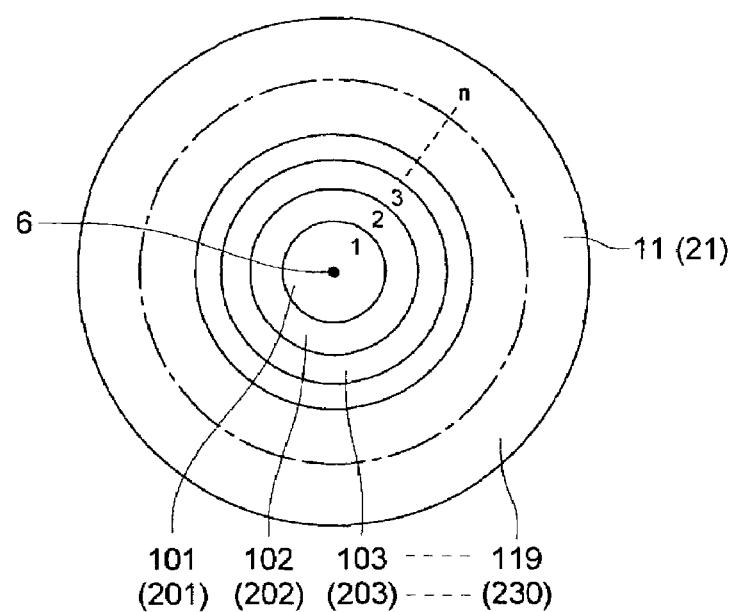
FIG. 4 is a front view showing the outline of an example of the first optical element and the second optical element or a multi ring-shaped zone phase difference lens as an optical element according to the present invention, in the optical pickup apparatus according to the present invention.

FIG. 3 and FIG. 4 are respectively a side view and a front view each showing an outline of multi-ring-shaped zone phase difference lenses 11 and 21 respectively in the first embodiment and the second embodiment.

The multi-ring-shaped zone phase difference lens in each of the first embodiment and the second embodiment is one wherein the second optical element (objective lens) and the first optical element (optical element) are unified solidly.

(First Embodiment)

Optical pickup device 1 of the present embodiment is one designed to conduct reading and writing of MO, and operating reference wavelength $\lambda_0$=685 nm, numerical aperture of optical system NA=0.55 and focal length=2.7 mm are used for the design.

Shapes of the diffractive surfaces (first surface 11A, second surface 11B) and refractive indexes of the multi-ring-shaped zone phase difference lens 11 used in the optical pickup device 1 are established as follows.

Lens data of the multi-ring-shaped zone phase difference lens 11 are shown in Table 1

TABLE 1

| Surface No. | Radius of curvature R (mm) | Distance on optical axis d (mm) | Refractive index n | | |
|---|---|---|---|---|---|
| | | | $\lambda$ = 675 nm | $\lambda$ = 685 nm | $\lambda$ = 695 nm |
| 0 | ∞ | | | | |
| 1 | 1.862 | 2.15 | 1.5368 | 1.5364 | 1.5362 |
| 2 | −3.875 | 0.85 | | | |
| 3 | ∞ | 0.6 | 1.58 | 1.58 | 1.58 |
| 4 | ∞ | | | | |

In Table 1 the surface numbers 1 and 2 are respectively the first surface 11A and second surface 11B of the multi-ring-shaped zone phase difference lens 11. The surface No. 3 and 4 are respectively the disk surface of MO and a recording layer.

Shapes of the first surface 11A and the second surface 11B of the multi-ring-shaped zone phase difference lens 11 are shown below.

With regard to the first surface 11A, base aspheric surface (shown with broken lines in FIG. 3) 11a shown with broken lines in FIG. 3 is divided, in the direction of an optical axis, into ring-shaped zones 101–119 which are in the shape of concentric circles whose centers are on the optical axis 6, and the ring-shaped zones are formed so that a thickness of each of them is increased as it is away farther from the optical axis 6. A step between two adjoining ring-shaped zones is established to be in the length wherein an optical path difference that is mostly a multiple of integer of operating reference wavelength $\lambda_0$ is caused between a light ray passing through one ring-shaped zone and a light ray passing through its adjoining ring-shaped zone, and a shifting of a wave-front is not caused.

The base aspheric surface of the first surface 11A of the multi-ring-shaped zone phase difference lens 11 and the second surface 11B are formed to be an axis-symmetrical aspheric surface around the optical axis 6 stipulated by the expression in which a coefficient shown in Table 2 is substituted in the following expression.

$$X = \frac{(h^2/R)}{1 + \sqrt{1 - (1+K)(h/R)^2}} + \sum_{i=1}^{16} A_i h^i \qquad \text{Numeral 3}$$

TABLE 2

| First surface | R = 1.8617 |
|---|---|
| | K = −1.0192 |
| | A4 = 7.9758 × 10⁻³ |
| | A6 = 7.1338 × 10⁻³ |
| | A8 = −1.1140 × 10⁻² |
| | A10 = 8.2309 × 10⁻³ |
| | A12 = −3.3306 × 10⁻³ |
| | A14 = 6.9847 × 10⁻⁴ |
| | A16 = −5.8651 × 10⁻⁵ |
| Second surface | R = −3.8746 |
| | K = −3.3168 × 10 |
| | A4 = −1.2867 × 10⁻² |
| | A6 = −3.6058 × 10⁻³ |
| | A8 = 1.1224 × 10⁻² |
| | A10 = −6.5301 × 10⁻³ |
| | A12 = 1.3368 × 10⁻³ |

Table 3 shows an amount of displacement in the direction of the optical axis for base aspheric surface 11a of respective ring-shaped zones which are formed on the first surface 11A of the multi-ring-shaped zone phase difference lens 11. With regard to the amount of displacement in the direction of optical axis 6 in Table 3 the direction from the first surface 11A of the multi-ring-shaped zone phase difference lens 11 to the second surface 11B is shown with a positive sign.

TABLE 3

| Ring-shaped zone No. | Inside diameter (mm) | Outside diameter (mm) | Displacement in optical axis direction for first ring-shaped zone (μm) |
|---|---|---|---|
| 1 | 0.000 | 0.380 | 0.00 |
| 2 | 0.380 | 0.535 | −1.29 |
| 3 | 0.535 | 0.652 | −2.58 |
| 4 | 0.652 | 0.751 | −3.89 |
| 5 | 0.751 | 0.836 | −5.20 |
| 6 | 0.836 | 0.913 | −6.53 |
| 7 | 0.913 | 0.981 | −7.86 |
| 8 | 0.981 | 1.044 | −9.21 |
| 9 | 1.044 | 1.101 | −10.56 |
| 10 | 1.101 | 1.153 | −11.92 |
| 11 | 1.153 | 1.201 | −13.29 |
| 12 | 1.201 | 1.246 | −14.67 |
| 13 | 1.246 | 1.288 | −16.06 |
| 14 | 1.288 | 1.327 | −17.46 |
| 15 | 1.327 | 1.364 | −18.86 |
| 16 | 1.364 | 1.400 | −20.28 |
| 17 | 1.400 | 1.434 | −21.70 |
| 18 | 1.434 | 1.467 | −23.13 |
| 19 | 1.467 | 1.500 | −24.56 |

As stated above, the multi-ring-shaped zone phase difference lens 11 is a lens in a form wherein an optical surface form (base aspheric surface) expressed by an expression for an aspheric surface is divided, by concentric circles having centers on the optical axis, into plural ring-shaped zones, and the form is obtained by shifting the surface of each ring-shaped zone in the direction of an optical axis so that rays of light passing through adjoining ring-shaped zones may cause an optical path difference which is mostly a multiple of integer of operating reference wavelength $\lambda_0$.

Concerning a lens which hardly has aberration for incident light flux of operating reference wavelength $\lambda_0$, an inside diameter and an outside diameter of each ring-shaped zone are determined in accordance with a method described in the paragraph (0014) as shown in Table 6 and the surface of each ring-shaped zone is moved to be in parallel with the direction of an optical axis. Though an optical path length of a light flux is changed by formation of the ring-shaped zone, an amount of displacement of each ring-shaped zone and a form of the surface are adjusted (lens is re-designed), so that wave-front aberration may be the minimum for the operating reference wavelength $\lambda_0$ and a light flux with used wavelength $\lambda$. By repeating the foregoing, the optimum displacement amount of each ring-shaped zone, an inside diameter, an outside diameter and a form of a base aspheric surface, for the operating reference wavelength $\lambda_0$ and a light flux with used wavelength $\lambda$.

Figure 5:
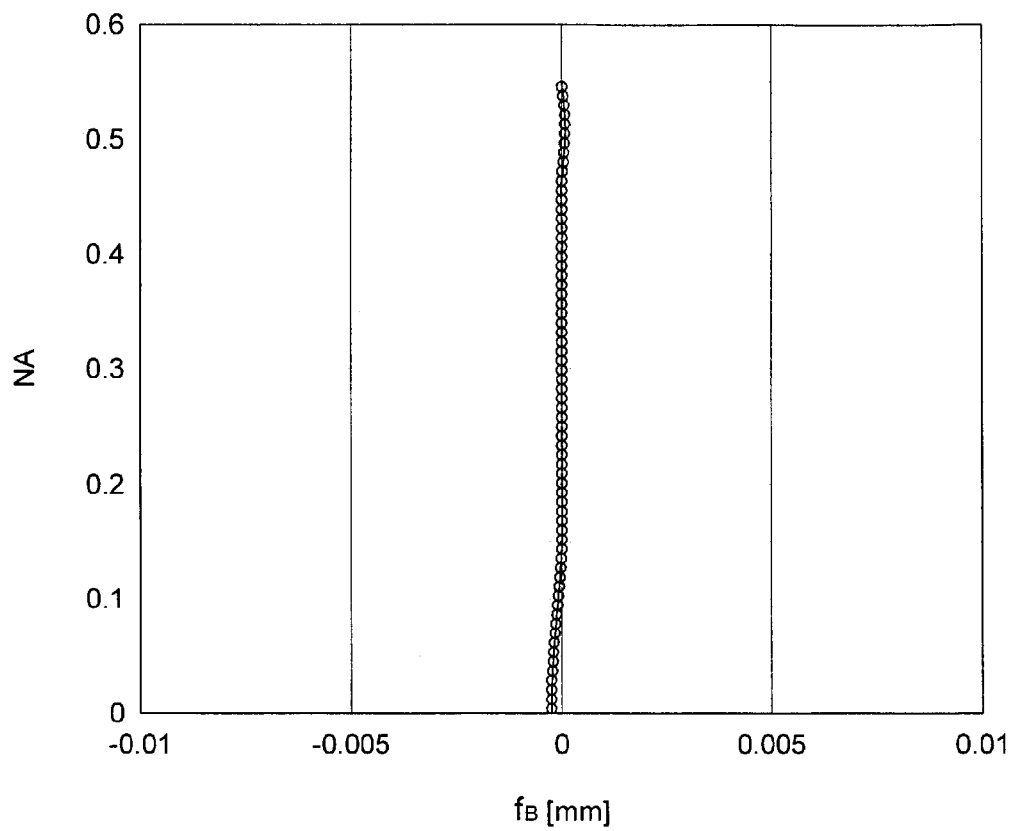
FIG. 5 is a longitudinal spherical aberration view when the light flux of the operating reference wavelength $\lambda_0$ comes to be incident on the multi-ring-shaped zone phase difference lens which is an example of the first optical element in an example of the optical pickup apparatus according to the present invention or an example of the optical element according to the present invention.

FIG. 5 shows a diagram of a longitudinal spherical aberration that is caused when a laser light flux with operating reference wavelength $\lambda_0$ (685 nm) enters the multi-ring-shaped zone phase difference lens 11.

Figure 6:
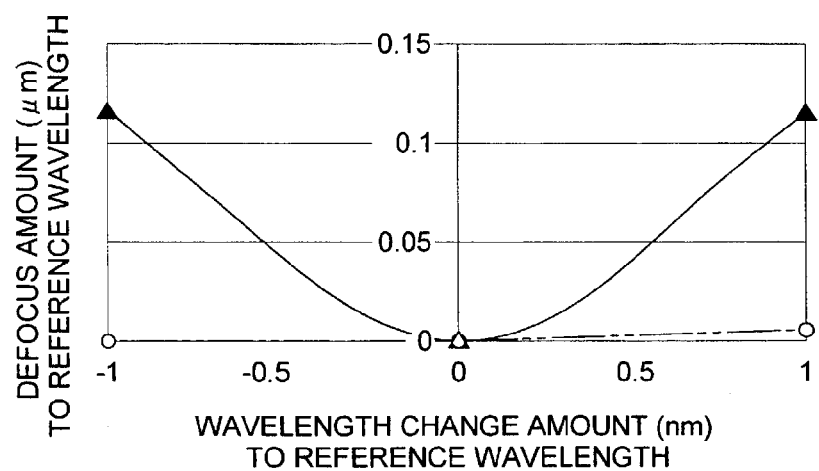
FIG. 6 is a view showing variations, in the optical axis direction, of a position of a converged light spot formed on the optical axis when a light flux comes to be incident on the first optical element and the second optical element or the multi-ring-shaped zone phase difference lens which is an example of an optical element according to the present invention and the wavelength of the light flux varies around the operating reference wavelength $\lambda_0$.

Further, under the assumption of occurrence of mode hop in the course of data writing on MO, a fluctuation in the direction of an optical axis for a light-converged spot formed on optical axis 6 when a wavelength of a laser light flux fluctuates within a range of ±1 nm for the operating reference wavelength $\lambda_0$ (685 nm), is shown in FIG. 6, in comparison with an occasion of "base aspherical lens" in which the multi-ring-shaped zone phase difference lens 11 is not provided with a ring-shaped zone.

If the focal depth ($\lambda_0/2NA^2$) of the optical system is about 1132 nm, and if fluctuation amount $\Delta f_B$ in the optical axis direction of light-converged spot that makes wave-front aberration to be the minimum is within a range that is a half of the focal depth on a geometrical optics basis, a diameter of a light-converged spot turns out to be the diameter ($\lambda_0/2NA$ or less) which is suitable for reading and writing data for MO. As shown in FIG. 6, a fluctuation amount $\Delta f_B$ in the direction of an optical axis for a light-converged spot for the occasion where the variation width of a wavelength of the laser light flux that enters is within a range of ±0.5 nm for the operating reference wavelength $\lambda_0$ is about 50 nm in maximum for "base aspherical lens"while, it is within about a few nm for the multi-ring-shaped zone phase difference lens 11.

(Second Embodiment)

Optical pickup device 2 in the present embodiment is one designed to conduct reading and writing for HD-DVD, and it is designed under the conditions that the operating reference wavelength $\lambda_0$ is 405 nm, numerical aperture NA of an optical system is 0.85 and a focal length is 1.76 mm.

Shapes of the diffractive surfaces (first surface 21A, second surface 21B) and refractive indexes of the multi-ring-shaped zone phase difference lens 21 used in the optical pickup device 2 are established as follows.

Lens data of the multi-ring-shaped zone phase difference lens 21 are shown in Table 4.

TABLE 4

| Surface No. | Radius of curvature R (mm) | Distance on optical axis d (mm) | Refractive index n | | |
|---|---|---|---|---|---|
| | | | $\lambda$ = 395 nm | $\lambda$ = 405 nm | $\lambda$ = 415 nm |
| Subject | | ∞ | | | |
| 1 (Aspheric surface) | 1.170 | 2.65 | 1.5265 | 1.5249 | 1.5235 |
| 2 (Aspheric surface) | −0.975 | 0.34 | | | |
| 3 Cover glass | ∞ | 0.1 | 1.62 | 1.62 | 1.62 |
| 4 | ∞ | | | | |

In Table 4 the surface numbers 1 and 2 are respectively the first surface 21A and second surface 21B of the multi-ring-shaped zone phase difference lens 21. The surface No. 3 and 4 are respectively the disk surface of HD-DVD and a recording layer.

Shapes of the first surface 21A and the second surface 21B of the multi-ring-shaped zone phase difference lens 21 are shown below.

With regard to the first surface 21A, base aspheric surface (shown with broken lines in FIG. 3) 21a shown with broken lines in FIG. 3 is divided, in the direction of an optical axis, into ring-shaped zones 201–230 which are in the shape of concentric circles whose centers are on the optical axis 6, and the ring-shaped zones are formed so that a thickness of each of them is increased as it is away farther from the optical axis 6. A step between two adjoining ring-shaped zones is established to be in the length wherein an optical path difference that is mostly a multiple of integer of operating reference wavelength $\lambda_0$ is caused between a light ray passing through one ring-shaped zone and a light ray passing through its adjoining ring-shaped zone, and a shifting of a wave-front is not caused.

The base aspheric surface of the first surface 21A of the multi-ring-shaped zone phase difference lens 21 and the second surface 21B are formed to be an axis-symmetrical aspheric surface around the optical axis 6 stipulated by the expression in which a coefficient shown in Table 5 is substituted in the aforesaid (Numeral 3).

TABLE 5

| First surface | R = 1.1699 |
|---|---|
| | K = −4.7888 |
| | A4 = 3.1250 × 10⁻¹ |
| | A6 = −2.6474 × 10⁻¹ |
| | A8 = 2.2284 × 10⁻¹ |
| | A10 = −1.2258 × 10⁻¹ |
| | A12 = 4.0399 × 10⁻² |
| | A14 = −6.4174 × 10⁻³ |
| | A16 = 2.3865 × 10⁻⁴ |
| Second surface | R = −9.7515 × 10⁻¹ |
| | K = −2.1704 × 10 |
| | A4 = 3.0802 × 10⁻¹ |
| | A6 = −6.3950 × 10⁻¹ |
| | A8 = 5.8536 × 10⁻¹ |
| | A10 = −2.1562 × 10⁻¹ |
| | A12 = 2.5227 × 10⁻⁴ |

| First surface | |
|---|---|
| R | $1.1699$ |
| K | $-4.7888$ |
| A4 | $3.1250 \times 10^{-1}$ |
| A6 | $-2.6474 \times 10^{-1}$ |
| A8 | $2.2284 \times 10^{-1}$ |
| A10 | $-1.2258 \times 10^{-1}$ |
| A12 | $4.0399 \times 10^{-2}$ |
| A14 | $-6.4174 \times 10^{-3}$ |
| A16 | $2.3865 \times 10^{-4}$ |
| Second surface | |
| R | $-9.7515 \times 10^{-1}$ |
| K | $-2.1704 \times 10$ |
| A4 | $3.0802 \times 10^{-1}$ |
| A6 | $-6.3950 \times 10^{-1}$ |
| A8 | $5.8536 \times 10^{-1}$ |
| A10 | $-2.1562 \times 10^{-1}$ |
| A12 | $2.5227 \times 10^{-4}$ |

Table 6 shows an amount of displacement in the direction of the optical axis for base aspheric surface 21a of respective ring-shaped zones which are formed on the first surface 21A of the multi-ring-shaped zone phase difference lens 21. With regard to the amount of displacement in the direction of optical axis 6 in Table 6 the direction from the first surface 21A of the multi-ring-shaped zone phase difference lens 21 to the second surface 21B is shown with a positive sign.

TABLE 6

| Ring-shaped zone No. | Inside diameter (mm) | Outside diameter (mm) | Displacement in optical axis direction for first ring-shaped zone (μm) |
|---|---|---|---|
| 1 | 0.000 | 0.341 | 0.00 |
| 2 | 0.341 | 0.479 | −3.92 |
| 3 | 0.479 | 0.581 | −7.89 |
| 4 | 0.581 | 0.666 | −11.93 |
| 5 | 0.666 | 0.739 | −16.03 |
| 6 | 0.739 | 0.804 | −20.19 |
| 7 | 0.804 | 0.862 | −24.43 |
| 8 | 0.862 | 0.915 | −28.73 |
| 9 | 0.915 | 0.964 | −33.10 |
| 10 | 0.964 | 1.009 | −37.55 |
| 11 | 1.009 | 1.051 | −42.07 |
| 12 | 1.051 | 1.090 | −46.67 |
| 13 | 1.090 | 1.126 | −51.36 |
| 14 | 1.126 | 1.160 | −56.12 |
| 15 | 1.160 | 1.193 | −60.97 |
| 16 | 1.193 | 1.223 | −65.90 |
| 17 | 1.223 | 1.252 | −70.92 |
| 18 | 1.252 | 1.279 | −76.03 |
| 19 | 1.279 | 1.304 | −81.23 |
| 20 | 1.304 | 1.329 | −86.51 |
| 21 | 1.329 | 1.352 | −91.88 |
| 22 | 1.352 | 1.373 | −97.33 |
| 23 | 1.373 | 1.394 | −102.86 |
| 24 | 1.394 | 1.414 | −108.47 |
| 25 | 1.414 | 1.432 | −114.15 |
| 26 | 1.432 | 1.450 | −119.89 |
| 27 | 1.450 | 1.467 | −125.68 |
| 28 | 1.467 | 1.483 | −131.51 |
| 29 | 1.483 | 1.499 | −137.37 |
| 30 | 1.499 | 1.514 | −143.25 |

As stated above, in the same way as in the multi-ring-shaped zone phase difference lens 11 in the first embodiment, the multi-ring-shaped zone phase difference lens 21 is a lens in a form wherein an optical surface form (base aspheric surface) expressed by an expression for an aspheric surface is divided, by concentric circles having centers on the optical axis, into plural ring-shaped zones, and the form is obtained by shifting the surface of each ring-shaped zone in the direction of an optical axis so that rays of light passing through adjoining ring-shaped zones may cause an optical path difference which is mostly a multiple of integer of operating reference wavelength $\lambda_0$.

Figure 7:
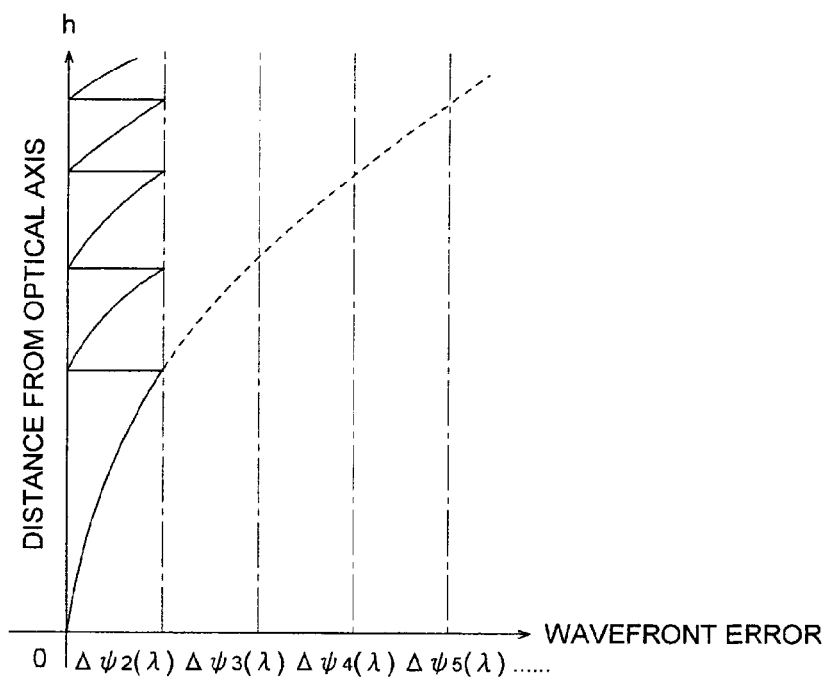
FIG. 7 is the wavefront error view when a light flux having a wavelength $\lambda_0$ different from the operating reference wavelength $\lambda_0$ comes to be incident on the first optical element and the second optical element or the multi-ring-shaped zone phase difference lens which is an example of the present invention in the optical pickup apparatus according to the present invention.

Concerning a lens which hardly has aberration for incident light flux of operating reference wavelength $\lambda_0$, an inside diameter and an outside diameter of each ring-shaped zone are determined in accordance with a method described in the paragraph (0014) as shown in FIG. 7, and the surface of each ring-shaped zone is moved to be in parallel with the direction of an optical axis. Though an optical path length of a light flux is changed by formation of the ring-shaped zone, an amount of displacement of each ring-shaped zone and a form of the surface are adjusted (lens is re-designed), so that wave-front aberration may be the minimum for the operating reference wavelength $\lambda_0$ and a light flux with used wavelength $\lambda$. By repeating the foregoing, the optimum displacement amount of each ring-shaped zone, an inside diameter, an outside diameter and a form of a base aspheric surface, for the operating reference wavelength $\lambda_0$ and a light flux with used wavelength $\lambda$.

Figure 8:
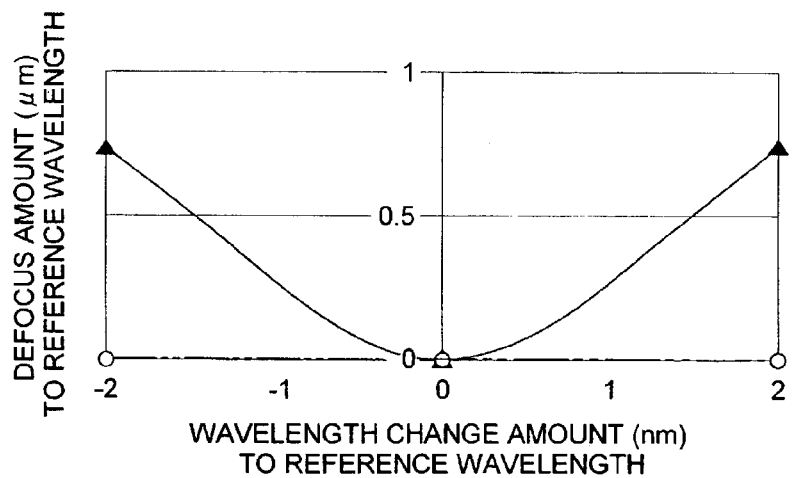
FIG. 8 is a view showing variations, in the optical axis direction, of a position of a converged light spot formed on the optical axis when a light flux comes to be incident on the first optical element and the second optical element or the multi-ring-shaped zone phase difference lens which is an example of an optical element according to the present invention and the wavelength of the light flux varies around the operating reference wavelength $\lambda_0$.

Further, under the assumption of occurrence of mode hop in the course of data writing on HD-DVD, a fluctuation in the direction of an optical axis for a light-converged spot formed on optical axis 6 when a wavelength of a laser light flux fluctuates within a range of ±2 nm for the operating reference wavelength $\lambda_0$ (405 nm), is shown in FIG. 8, in comparison with an occasion of "base aspherical lens" in which the multi-ring-shaped zone phase difference lens 21 is not provided with a ring-shaped zone.

If the focal depth ($\lambda_0/2NA^2$) of the optical system is about 280 nm, and if fluctuation amount $\Delta f_B$ in the optical axis direction of light-converged spot that makes wave-front aberration to be the minimum is within a range that is a half of the focal depth on a geometrical optics basis, a diameter of a light-converged spot turns out to be the diameter ($\lambda_0/2NA$ or less) which is suitable for reading and writing data for HD-DVD. As shown in FIG. 8, a fluctuation amount $\Delta f_B$ in the direction of an optical axis for a light-converged spot for the occasion where the variation width of a wavelength of the laser light-flux that enters is within a range of ±2 nm for the operating reference wavelength $\lambda_0$ is about 750 nm in maximum for "base aspherical lens", while, it is within about several tens nm for the multi-ring-shaped zone phase difference lens 21.

Figure 9:
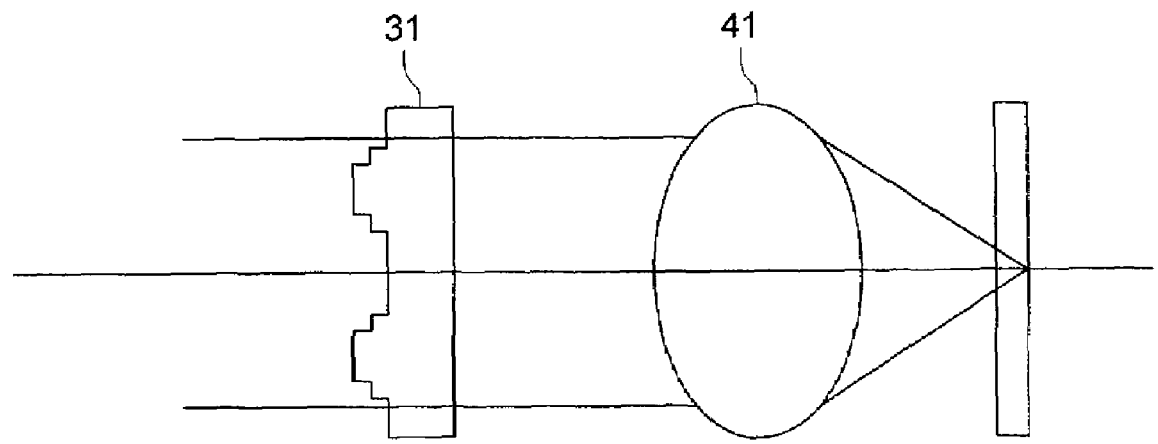
FIG. 9 is a view showing an example structured by 2 optical elements.
Figure 10:
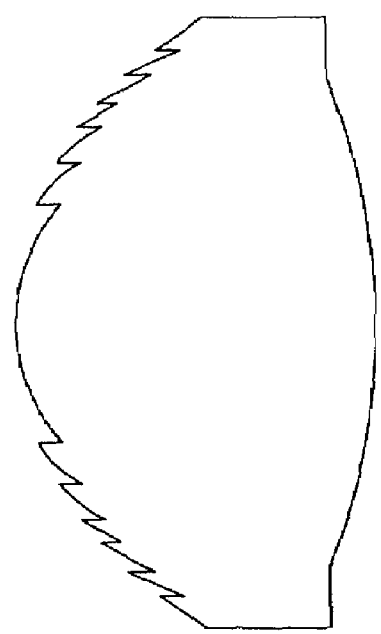
FIG. 10 is a sectional view of an DVD/CD compatible objective lens for the definite light/infinite conjugate system.
Figure 11:
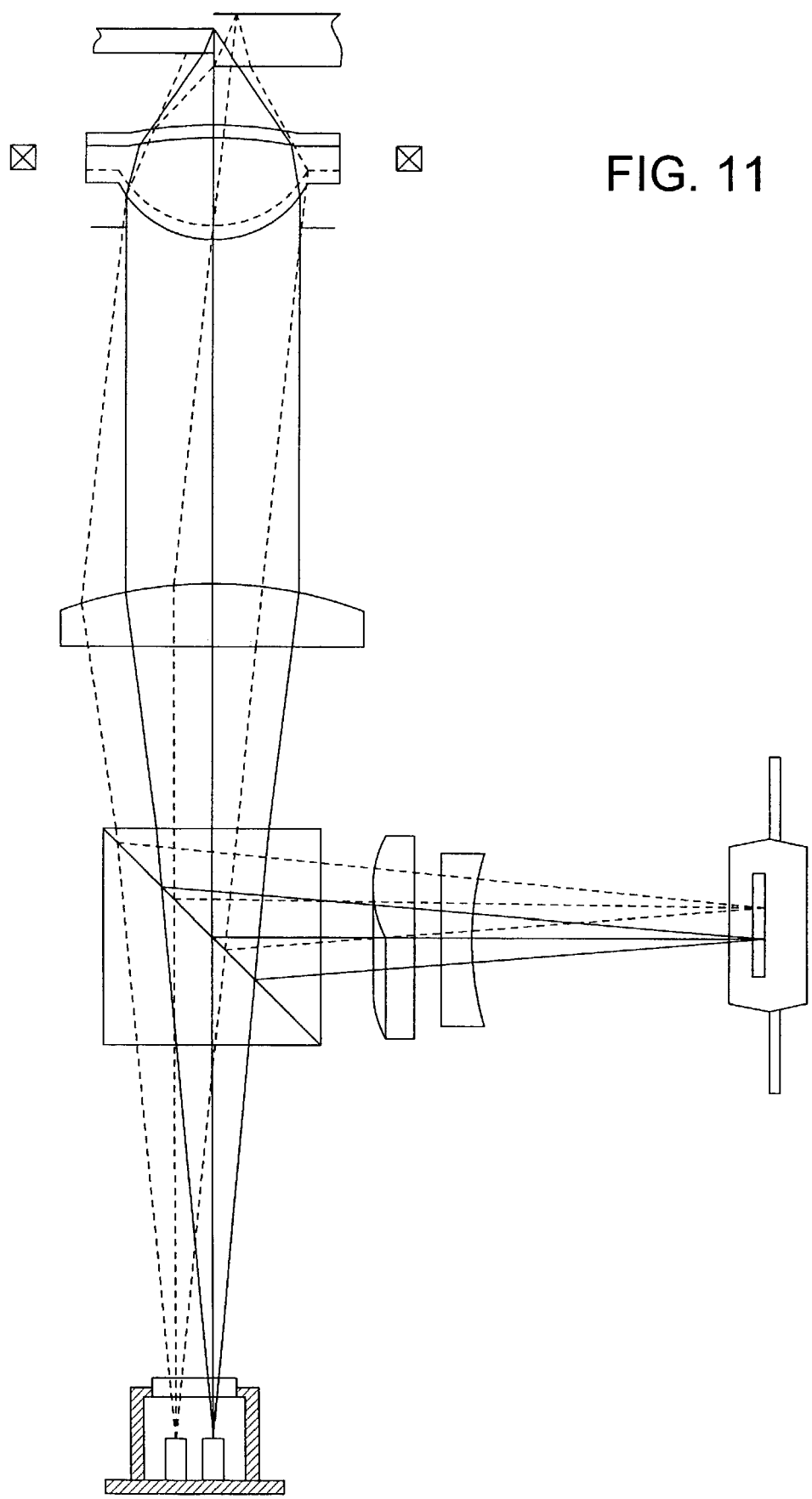
FIG. 11 is an outline view of an optical pickup apparatus in which the objective lens in FIG. 10 is assembled, and is an infinite system.
Figure 12:
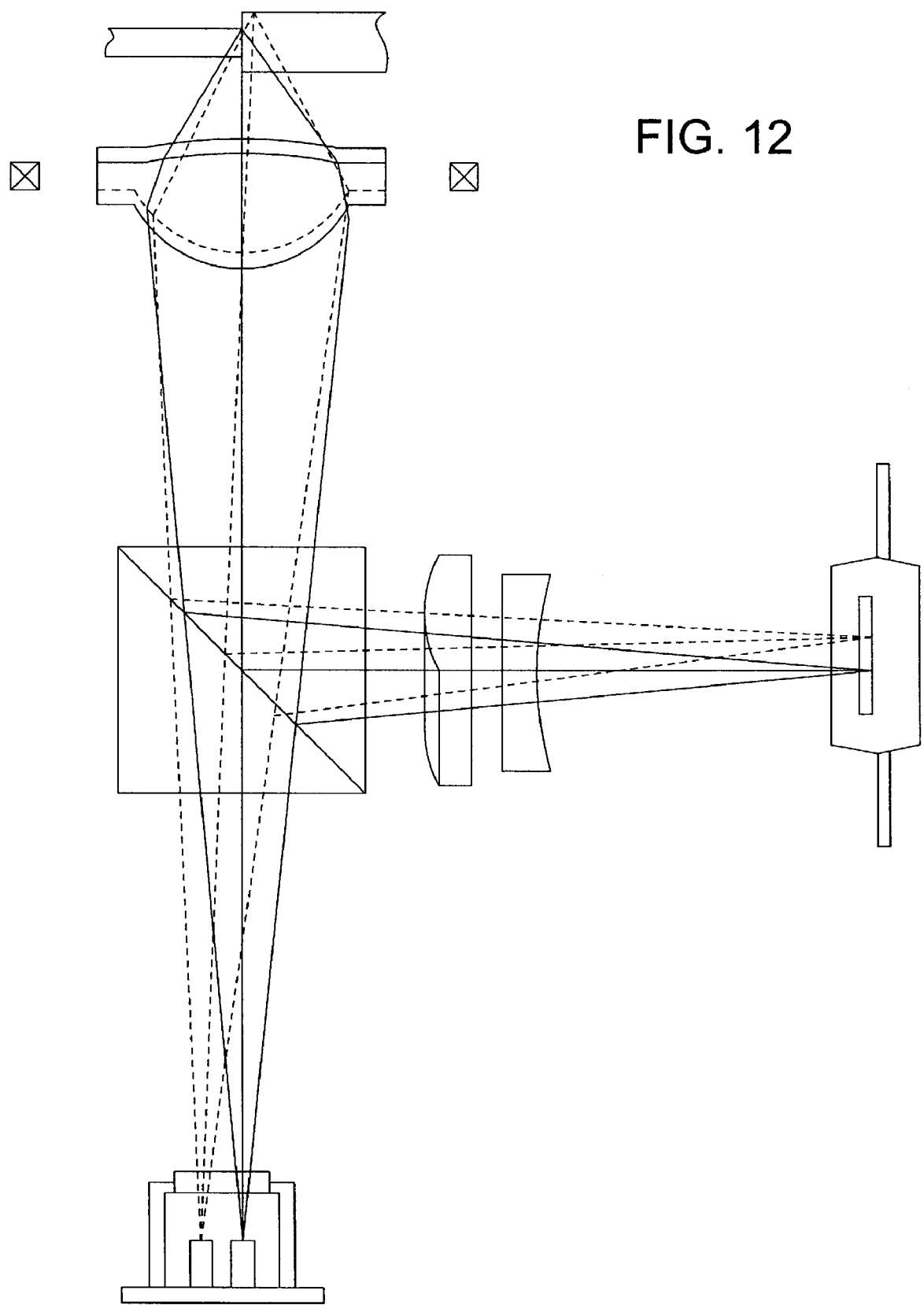
FIG. 12 is an outline view of the optical pickup apparatus in which the objective lens in FIG. 10 is assembled, and is a definite system.

Furthermore, as shown in FIG. 9, the first optical element 31 having the optical path difference providing function and the second optical element 41 having the refractive function may be separately structured. According to such a structure, because the optical element design in which the optical path difference proving function and the refracting function are individually independently considered can be conducted, the degree of freedom of the design is spread. Further, by using the objective lens of the present invention shown in FIG. 10, the pickup apparatus shown in FIG. 11 can be structured. In the structure, when the light source which emits the laser of the wavelength of 780 nm, is used for one side light source, and the light source which emits the laser of the wavelength of 650 nm, is used for the other light source, the recording or reproducing for the CD and DVD can be conducted. Further, by using the objective lens of the present invention shown in FIG. 10, the pickup apparatus shown in FIG. 11 can be structured. The same light source as each light source shown in FIG. 11 is used for each light source, and the recording or reproducing for the CD and DVD can be conducted. The difference from the pickup apparatus shown in FIG. 11 is a point in which it is structured such that the definite light comes to be incident on the objective lens. By this structure, because it is not necessary that the collimator lens is used for the pickup apparatus shown in FIG. 12, the size of the whole pickup apparatus can be reduced.

According to the structure described in Item 1 since an incident light flux having the operating reference wavelength $\lambda_0$ is converged on the information recording surface with almost no aberration, and when a light flux having an operating wavelength $\lambda$ different from the operating reference wavelength $\lambda_0$ ($|\lambda-\lambda_0|<1$ [nm]) comes to be incident, the paraxial chromatic aberration is corrected, even if the wavelength of an incident light flux varies from the operating reference wavelength $\lambda_0$ to an operating wavelength $\lambda$ different from the operating reference wavelength $\lambda_0$ ($|\lambda-\lambda_0|<1$ [nm]) due to mode hopping generated momentarily when the reading condition for an optical information recording medium is switched to the writing condition for an optical information recording medium, an error can be prevented to occur at the time of writing the data onto the optical information recording medium.

According to the structure described in Item 2 when a light flux having the operating reference wavelength $\lambda_0$ comes to be incident, no phase difference is provided by a optical path difference providing function of the fist optical element and the second optical element is designed such that an incident surface and an emitting surface are respectively an aspherical surface with which an aberration of a light ray becomes no aberration. Therefore, a light flux having passed through the first optical element and the second optical element is converged with almost no aberration.

When the light flux of the operating wavelength $\lambda$ different from the operating reference wavelength $\lambda_0$ ($|\lambda-\lambda_0|<1$ [nm]) comes to be incident, by the refractive index under the influence of the dispersion of the second optical element, the wave front aberration is generated at a position where a converged light spot becomes optimum with the operating reference wavelength $\lambda_0$.

The relationship of the phase difference providing amount $\Psi(\lambda_0)$ by the optical path difference providing function of the first optical element and the difference d of the thickness in the optical axis direction of the ring-shaped zone is, when n ($\lambda_0$) is the refractive index, and k is integer, expressed by [Expression 1]

The difference d of the thickness of the ring-shaped zone called herein means, as shown in FIG. 1, the difference of the thickness in the optical axis direction between a certain ring-shaped zone and the extension of the first ring-shaped zone including the optical axis. The first ring-shaped zone is expressed by the aspheric surface expression, and is extended according to the expression.

The changed amount $\Delta\Psi(\lambda)$ of the phase difference providing amount, by the case where the wavelength of the incident light flux is changed from the operating reference wavelength $\lambda_0$ to the operating wavelength $\lambda$, is expressed by [Expression 2], by assuming that the change of the refractive index of the second optical element due to variations of the wavelength is $\delta$.

The above change amount is caused by both of a phase difference change amount due to the difference d in thickness of ring-shaped zones and a phase difference change amount due to color dispersion of a refractive index of the first optical element.

If a thickness of ring-shaped zones is formed in the direction in which the changed amount $\Delta\Psi(\lambda)$ of the phase difference providing amount and the wave front aberration generated by the change of the refractive function due to the influence of the dispersion of the second optical element are negated each other, an optical path length of a light ray becomes longer as the distant from the optical axis becomes longer. Further, the difference d of the thickness of the ring-shaped zone and the inner diameter and outer diameter in the vertical direction to the optical axis of each ring-shaped zone are determined by the operating reference wavelength $\lambda_0$ of the target optical system, a raw material constituting the optical element, and the numerical aperture.

When a wavelength is varied from the operating reference wavelength $\lambda_0$ to an operating wavelength $\lambda$, if a variation $\Delta f_B$ of a position of a converged light spot formed on the optical axis is located in a range indicated in the following formula without correcting necessarily a wavefront aberration to be no aberration at the same position on the optical axis, a writing error for MO at the time of mode hopping can be avoided.

$$|\Delta f_B/(\lambda-\lambda_0)|<2000 \quad (3)$$

The width of the position along the optical axis where the radius of the converged light spot in the geometrical optical view becomes ($\lambda_0/2NA$) or less is called a focal depth ($\lambda_0/2NA^2$). If the radius of the converged light spot is ($\lambda_0/2NA$) or less, the intensity of the converged light spot necessary for reading an optical disk can be obtained.

In an optical pickup apparatus of MO, since the operating reference wavelength $\lambda_0$ is almost 600 to 700 nm and numerical aperture NA is almost 0.5 to 0.6 the focal depth ($\lambda_0/2NA^2$) of the optical system is about $1.4\lambda_0$ to $2.0\lambda_0$. Further, a variation value $|\lambda-\lambda_0|$ of the wavelength when mode hopping occurs on the optical pickup apparatus of MO is a few tenth nm. Therefore, the formula (3) is satisfied and a variation value $\Delta f_B$ of the position of a converged light spot is made within a range of the half of the focal depth.

According to the structure described in Item 3 since the operating reference wavelength $\lambda_0$ satisfies the following formula: 600 nm<$\lambda_0$<700 nm, the effect similar to that obtained by the structure of Item 1 can be obtained for a laser light flux having a wavelength of 600 nm to 700 nm which is used for reading or writing data for MO.

In the structure of Item 4 on the position of the converged light spot where wavefront aberration becomes the smallest when the operating reference wavelength $\lambda_0$ comes to be incident, a wavefront error caused by a refracting function when a wavelength is varied is increased as the numerical aperture becomes larger. The term "wavefront error" described herein means a difference between the deviation of the wavefront of a paraxial ray and the deviation of a wavefront of a light ray corresponding to a specific numerical aperture.

When the numerical aperture is small, the number of ring-shaped zones necessary for correcting the wave front error is almost equal to the result in which the maximum value of the wave front error is divided by the changed amount $\Delta\Psi(\lambda)$ of the phase difference providing amount.

By making the wave front aberration when the wavelength is changed at the position of the converged light spot at which the wave front aberration is minimum when the light flux of the operating reference wavelength $\lambda_0$ comes to be incident, to be within the range necessary for reading or writing the data onto the optical information recording medium, even when the number of ring-shaped zones is smaller than the number in which the maximum value of the wave front error is divided by the changed amount $\Delta\Psi(\lambda)$ of the phase difference providing amount, the reading error is not generated at the time of mode hopping. In order to conduct reading or writing data for MO, the number of ring-shaped zones is preferably 3 to 30. According to the structure of Item 4 the effect similar to that obtained by the structure of Item 3 can be obtained with regard to the number of the ring-shaped zones.

Further, generally, when the number of the ring-shaped zones becomes smaller, the wavefront aberration becomes larger. However, there is a merit that the optical element can be processed easily.

According to the structure described in Item 5 since the numerical aperture NA of the optical system is 0.65 or less, the effect similar to that obtained by the structure of Item 2 and Item 3 can be obtained for the numerical aperture NA of 0.5 to 0.6 which is necessary for reading or writing data for MO.

Since the focal depth ($\lambda_0/2NA^2$) of the optical system is $1.2\lambda_0$ or more, when a variation rate $|(\lambda-\lambda_0)/\lambda_0|$ of the wavelength of an incident light flux into a optical system due to mode hopping satisfies the following formula, $$|(\lambda-\lambda_0)/\lambda_0|<5.9\times10^{-4} \qquad (4)$$

the formula (3) is satisfied and a variation value $\Delta f_B$ of the position of a converged light spot is made within a range of the half of the focal depth.

In the case of MO, since the operating reference wavelength $\lambda_0$ is almost 600 to 700 nm and a variation value $|\lambda-\lambda_0|$ of the wavelength due to mode hopping is a few tenth nm, the formula (4) is almost satisfied and a writing error for MO due to mode-hopping can be avoided.

According to the structure described in Item 6 when a light flux having the operating reference wavelength $\lambda_0$ comes to be incident, no phase difference is provided by a optical path difference providing function of the fist optical element and the second optical element is designed such that an incident surface and an emitting surface are respectively an aspherical surface with which an aberration of a light ray becomes no aberration. Therefore, a light flux having passed through the first optical element and the second optical element is converged with almost no aberration.

When the light flux of the operating wavelength $\lambda$ different from the operating reference wavelength $\lambda_0$ ($|\lambda-\lambda_0|<2$ [nm]) comes to be incident, by the refractive index under the influence of the dispersion of the second optical element, the wave front aberration is generated at a position where a converged light spot becomes optimum with the operating reference wavelength $\lambda_0$.

The relationship of the phase difference providing amount $\Psi(\lambda_0)$ by the optical path difference providing function of the first optical element and the difference d of the thickness in the optical axis direction of the ring-shaped zone is, when n ($\lambda_0$) is the refractive index, and k is integer, expressed by [Expression 1].

The changed amount $\Delta\Psi(\lambda)$ of the phase difference providing amount, by the case where the wavelength of the incident light flux is changed from the operating reference wavelength $\lambda_0$ to the operating wavelength X, is expressed by [Expression 2], by assuming that the change of the refractive index of the second optical element due to variations of the wavelength is $\delta$. The above change amount is caused by both of a phase difference change amount due to the difference d in thickness of ring-shaped zones and a phase difference change amount due to color dispersion of a refractive index of the first optical element.

If a thickness of ring-shaped zones is formed in the direction in which the changed amount $\Delta\Psi(\lambda)$ of the phase difference providing amount and the wave front aberration generated by the change of the refractive function due to the influence of the dispersion of the second optical element are negated each other, an optical path length of a light ray becomes longer as the distant from the optical axis becomes longer. Further, the difference d of the thickness of the ring-shaped zone and the inner diameter and outer diameter in the vertical direction to the optical axis of each ring-shaped zone are determined by the operating reference wavelength $\lambda_0$ of the target optical system, a raw material constituting the optical element, and the numerical aperture.

When a wavelength is varied from the operating reference wavelength $\lambda_0$ to an operating wavelength $\lambda$, if a variation $\Delta f_B$ of a position of a converged light spot formed on the optical axis is located in a range indicated in the following formula without correcting necessarily a wavefront aberration to be no aberration at the same position on the optical axis, a writing error for HD-DVD at the time of mode hopping can be avoided.

$$|\Delta f_B(\lambda-\lambda_0)|<150 \qquad (5)$$

The width of the position along the optical axis where the radius of the converged light spot in the geometrical optical view becomes ($\lambda_0/2NA$) or less is called a focal depth ($\lambda_0/2NA^2$). If the radius of the converged light spot is ($\lambda_0/2NA$) or less, the intensity of the converged light spot necessary for reading an optical disk can be obtained.

In an optical pickup apparatus of HD-DVD, since the operating reference wavelength $\lambda_0$ is almost 400 to 500 nm and numerical aperture NA is almost 0.65 to 0.85 the focal depth ($\lambda_0/2NA^2$) of the optical system is about $0.69\lambda_0$ to $1.2\lambda_0$. Further, a variation value $|\lambda-\lambda_0|$ of the wavelength when mode hopping occurs on the optical pickup apparatus of HD-DVD is a few tenth nm. Therefore, the formula (5) is satisfied and a variation value $\Delta f_B$ of the position of a converged light spot is made within a range of the half of the focal depth.

According to the structure described in Item 7 since the operating reference wavelength $\lambda_0$ satisfies the following formula: 400 nm<$\lambda_0$<500 nm, the effect similar to that obtained by the structure of Item 6 can be obtained for a laser light flux having a wavelength of 400 nm to 500 nm which is used for reading or writing data for HD-DVD.

In the structure of Item 8 on the position of the converged light spot where wavefront aberration becomes the smallest when the operating reference wavelength $\lambda_0$ comes to be incident, a wavefront error caused by a refracting function when a wavelength is varied is increased as the numerical aperture becomes larger. The term "wavefront error" described herein means a difference between the deviation of the wavefront of a paraxial ray and the deviation of a wavefront of a light ray corresponding to a specific numerical aperture.

When the numerical aperture is small, the number of ring-shaped zones necessary for correcting the wave front error is almost equal to the result in which the maximum value of the wave front error is divided by the changed amount $\Delta\Psi(\lambda)$ of the phase difference providing amount. By making the wave front aberration when the wavelength is changed at the position of the converged light spot at which the wave front aberration is minimum when the light flux of the operating reference wavelength $\lambda_0$ comes to be incident, to be within the range necessary for reading or writing the data onto the optical information recording medium, even when the number of ring-shaped zones is smaller than the number in which the maximum value of the wave front error is divided by the changed amount $\Delta\Psi(\lambda)$ of the phase difference providing amount, the reading error is not generated at the time of mode hopping. In order to conduct reading or writing data for HD-DVD, the number of ring-shaped zones is preferably 20 to 60. According to the structure of Item 8 the effect similar to that obtained by the structure of Item 7 can be obtained with regard to the number of the ring-shaped zones.

Further, generally, when the number of the ring-shaped zones becomes smaller, the wavefront aberration becomes larger. However, there is a merit that the optical element can be processed easily.

According to the structure described in Item 9 the effect similar to that obtained by the structure of Item 7 or Item 8 can be obtained, further, since the numerical aperture NA of the optical system is 0.9 or less, the effect similar to that obtained by the structure of Item 7 and Item 8 can be obtained for the numerical aperture NA of 0.65 to 0.85 which is necessary for reading or writing data for HD-DVD.

Since the focal depth ($\lambda_0/2NA^2$) of the optical system is 0.62$\lambda_0$ or more, when a variation rate $|(\lambda-\lambda_0)/\lambda_0|$ of the wavelength of an incident light flux into a optical system due to mode hopping satisfies the following formula, $$|(\lambda-\lambda_0)/\lambda_0| < 4.1 \times 10^{-3} \quad (6)$$

the formula (5) is satisfied and a variation value $\Delta f_B$ of the position of a converged light spot is made within a range of the half of the focal depth.

In the case of HD-DVD, since the operating reference wavelength $\lambda_0$ is almost 400 to 500 nm and a variation value $|\lambda-\lambda_0|$ of the wavelength due to mode hopping is a few tenth nm, the formula (6) is almost satisfied and a writing error for HD-DVD due to mode hopping can be avoided.

According to the structure described in Item 10, when a light flux having the operating reference wavelength $\lambda_0$ comes to be incident, a spherical aberration by a refracting function of the optical element is designed to be over-corrected (over). However, since the optical element has both of the refracting function and the optical path difference providing function, the effect similar to that in the case the thickness of the optical element substantially becomes thicker is caused. As shown in FIG. 1, in comparison with a light ray passing through an optical element provided with only the refracting function, when a light ray passes through an optical element provided with both of the refracting function and the optical path difference providing function, the length of an optical path of the light ray in the optical element becomes longer. As a result, the spherical aberration which is made "over" by the refracting function of the optical element is received the action to make "under" so that the spherical aberration becomes almost no aberration.

The term "under" called herein is reverse to "over" and means that a point at which an incident light flux intersects with the optical axis comes close to the optical element. However, the term "under" includes the case that locally an incident light flux intersects with the optical axis at a position far from the optical element in a partial region having a high numerical aperture.

With regard to the shape of the surface of the optical element described in Item 10 basically, the optical element having the refracting function and the optical path difference providing function may be made by simply shifting the shape of an aspherical surface having a refracting function by a distance corresponding to a optical path difference.

However, when a numerical aperture becomes large and a radius of curvature of the surface of an optical element becomes small, since the necessary to consider precisely an optical path length arises, there may be a case that the above function can not obtained only by shifting the shape of an aspherical surface having a refracting function by a distance corresponding to a optical path difference. In this case, by further changing the shape of the refractive surface performing a refractive function, an optical element having both of the refracting function and the optical path difference providing function.

In this way, according to the structure of Item 10 the effect similar to that obtained by the structure of Item 2 can be obtained.

According to the structure described in Item 11 the effect similar to that obtained by the structure of Item 3 can be obtained.

In the structure of Item 12 on the position of the converged light spot where wavefront aberration becomes the smallest when the operating reference wavelength $\lambda_0$ comes to be incident, a wavefront error caused by a refracting function when a wavelength is varied is increased as the numerical aperture becomes larger. The term "wavefront error" described herein means a difference between the deviation of the wavefront of a paraxial ray and the deviation of a wavefront of a light ray corresponding to a specific numerical aperture.

When the numerical aperture is small, the number of ring-shaped zones necessary for correcting the wave front error is almost equal to the result in which the maximum value of the wave front error is divided by the changed amount $\Delta\Psi(\lambda)$ of the phase difference providing amount. However, in the case that an optical element has a refracting function and an optical path difference providing function, particularly when a numerical aperture becomes larger, the deviation from the value becomes larger.

By making the wave front aberration when the wavelength is changed at the position of the converged light spot at which the wave front aberration is minimum when the light flux of the operating reference wavelength $\lambda_0$ comes to be incident, to be within the range necessary for reading or writing the data onto the optical information recording medium, even when the number of ring-shaped zones is smaller than the number in which the maximum value of the wave front error is divided by the changed amount $\Delta\Psi(\lambda)$ of the phase difference providing amount, the reading error is not generated at the time of mode hopping. In order to conduct reading or writing data for MO, the number of ring-shaped zones is preferably 3 to 30. According to the structure of Item 12 the effect similar to that obtained by the structure of Item 11 can be obtained with regard to the number of the ring-shaped zones.

Further, generally, when the number of the ring-shaped zones becomes smaller, the wavefront aberration becomes larger. However, there is a merit that the optical element can be processed easily.

According to the structure described in Item 13 the effect similar to that obtained by the structure of Item 5 can be obtained.

According to the structure described in Item 14 the effect similar to that obtained by the structure of one of Item 11 to Item 13 can be obtained, and since a distance between a position where a light ray having passed through at a position located farthest from the optical axis of the optical element intersects with the optical axis by the refracting function and a position where a paraxial ray intersects with the optical axis by the refracting function us 0.02 mm or less, a light flux having an operating reference wavelength $\lambda_0$ is made to be no aberration by the refracting function and the optical path different providing function.

According to the structure described in Item 15, when a light flux having the operating reference wavelength $\lambda_0$ comes to be incident, a spherical aberration by a refracting function of the optical element is designed to be over-corrected (over) However, since the optical element has both of the refracting function and the optical path difference providing function, the effect similar to that in the case the thickness of the optical element substantially becomes thicker is caused. As shown in FIG. 1, in comparison with a light ray passing through an optical element provided with only the refracting function, when a light ray passes through an optical element provided with both of the refracting function and the optical path difference providing function, the length of an optical path of the light ray in the optical element becomes longer. As a result, the spherical aberration which is made "over" by the refracting function of the optical element is received the action to make "under" so that the spherical aberration becomes almost no aberration.

The term "under" called herein is reverse to "over" and means that a point at which an incident light flux intersects with the optical axis comes close to the optical element. However, the term "under" includes the case that locally an incident light flux intersects with the optical axis at a position far from the optical element in a partial region having a high numerical aperture.

With regard to the shape of the surface of the optical element described in Item 15 basically, the optical element having the refracting function and the optical path difference providing function may be made by simply shifting the shape of an aspherical surface having a refracting function by a distance corresponding to a optical path difference.

However, when a numerical aperture becomes large and a radius of curvature of the surface of an optical element becomes small, since the necessary to consider precisely an optical path length arises, there may be a case that the above function can not obtained only by shifting the shape of an aspherical surface having a refracting function by a distance corresponding to a optical path difference. In this case, by further changing the shape of the refractive surface performing a refractive function, an optical element having both of the refracting function and the optical path difference providing function.

In this way, according to the structure of Item 15 the effect similar to that obtained by the structure of Item 6 can be obtained.

According to the structure described in Item 16 the effect similar to that obtained by the structure of Item 7 can be obtained.

In the structure of Item 17 on the position of the converged light spot where wavefront aberration becomes the smallest when the operating reference wavelength $\lambda_0$ comes to be incident, a wavefront error caused by a refracting function when a wavelength is varied is increased as the numerical aperture becomes larger. The term "wavefront error" described herein means a difference between the deviation of the wavefront of a paraxial ray and the deviation of a wavefront of a light ray corresponding to a specific numerical aperture.

When the numerical aperture is small, the number of ring-shaped zones necessary for correcting the wave front error is almost equal to the result in which the maximum value of the wave front error is divided by the changed amount $\Delta\Psi(\lambda)$ of the phase difference providing amount. However, in the case that an optical element has a refracting function and an optical path difference providing function, particularly when a numerical aperture becomes larger, the deviation from the value becomes larger.

By making the wave front aberration when the wavelength is changed at the position of the converged light spot at which the wave front aberration is minimum when the light flux of the operating reference wavelength $\lambda_0$ comes to be incident, to be within the range necessary for reading or writing the data onto the optical information recording medium, even when the number of ring-shaped zones is smaller than the number in which the maximum value of the wave front error is divided by the changed amount $\Delta\Psi(\lambda)$ of the phase difference providing amount, the reading error is not generated at the time of mode hopping. In order to conduct reading or writing data for MO, the number of ring-shaped zones is preferably 3 to 30. According to the structure of Item 17, the effect similar to that obtained by the structure of Item 16 can be obtained with regard to the number of the ring-shaped zones.

Further, generally, when the number of the ring-shaped zones becomes smaller, the wavefront aberration becomes larger. However, there is a merit that the optical element can be processed easily.

According to the structure described in Item 18, the effect similar to that obtained by the structure of Item 9 can be obtained.

According to the structure described in Item 19, the effect similar to that obtained by the structure of one of Item 16 to Item 18 can be obtained, and since a distance between a position where a light ray having passed through at a position located farthest from the optical axis of the optical element intersects with the optical axis by the refracting function and a position where a paraxial ray intersects with the optical axis by the refracting function is 0.03 mm or less, a light flux having an operating reference wavelength $\lambda_0$ is made to be no aberration by the refracting function and the optical path different providing function.

What is claimed is:

1. An optical element for use in an optical pickup apparatus for converging a light flux onto an information recording plane of an optical information recording medium, comprising:

an optical path difference providing section having a function of providing an optical path difference, the optical path difference providing section being divided coaxially around an optical axis so as to form a plurality of ring-shaped zones each of which has a respective different thickness along the direction of the optical axis so that the optical path difference providing section makes the length of an optical path of a light ray having passed through a ring-shaped zone among the plurality of ring-shaped zones longer than the length of an optical path of a light ray having passed through a neighboring ring-shaped zone located next to an optical axis side of the ring-shaped zone by a length obtained by multiplying an operating reference wavelength $\lambda_0$ with an integer; and a refracting section having a refracting function of optimizing a spherical aberration of a converged light spot of a light flux which has the operating reference wavelength $\lambda_0$ and is converged onto the information recording plane;

wherein the optical element converges an incident light flux having the operating reference wavelength $\lambda_0$ onto the information recording plane with almost no aberration, and the following formula is satisfied:

$$|\Delta f_B/(\lambda-\lambda_0)|<2000$$

where $\Delta f_B$ is a distance along the direction of the optical axis between a converged light spot formed by an incident light flux having an operating wavelength $\lambda$ different from the operating reference wavelength $\lambda_0$ ($|\lambda-\lambda_0|<1$ [nm]) and a converged light spot formed by an incident light flux having the operating reference wavelength $\lambda_0$, and wherein in each of the plurality of ring-shaped zones, the radius (mm) of the innermost peripheral section and the radius (mm) of the outermost peripheral section of each zone are determined such that a wavefront error at the converged light spot formed by the incident light flux having the operating wavelength $\lambda$ between a light ray having passed through the innermost peripheral section and a light ray having passed through the outermost peripheral section becomes $\Delta\Psi(\lambda)$, $$\Delta\Psi(\lambda)=\Psi(\lambda_0)(-1/\lambda_0+\delta/(n(\lambda_0)-1))\times(\lambda-\lambda_0)$$

$$=k(-1/\lambda_0+\delta/(n(\lambda_0)-1))\Delta\lambda$$

$$(\Delta\lambda=\lambda-\lambda_0, \delta=dn/d\lambda)$$

wherein $n(\lambda_0)$ is a refractive index, $\delta$ is a change of the refractive index due to variations of the wavelength, and k is an integer.

2. The optical element of claim 1, wherein the operating reference wavelength $\lambda_0$ satisfies the following formula:

$$600 \text{ nm}<\lambda_0<700 \text{ nm}$$

3. The optical element of claim 1, wherein the number of ring-shaped zones formed on the first optical element is 3 to 30.

4. The optical element of claim 1, wherein the numerical aperture of the optical element is 0.65 or less.

5. The optical element of claim 1, wherein among the light flux, a distance between a position where a light ray having passed through at a position located farthest from the optical axis of the optical element intersects with the optical axis by the refracting function and a position where a paraxial ray intersects with the optical axis by the refracting function is 0.02 mm or less.

6. The optical element of claim 1, wherein the optical element is structured such that a divergent light flux comes to be incident into the optical element.

7. The optical element of claim 1, wherein the optical element comprises a compatible structure, converges a light flux having a wavelength $\lambda_0$ and having passed through the compatible structure on a condition capable of recording or reproducing a first optical information recording medium, and converges a light flux having a wavelength $\lambda_1$ ($\lambda_0<\lambda_1$) and having passed through the compatible structure on a condition capable of recording or reproducing a second optical information recording medium.

8. The optical element of claim 7, wherein the compatible structure is a diffractive structure.

9. The optical element of claim 7, wherein the compatible structure is structured such that a proceeding direction of a light ray is the same direction with a refracting direction by each of the plurality of ring-shaped zones and a phase $\Phi$ of a wavefront having passed through each of the plurality of ring-shaped zones satisfies the following formula at a position of an image plane where the wavefront aberration of a converged light spot becomes the minimum:

$$-0.5\pi\leq\Phi\leq0.5\pi$$

10. An optical element for use in an optical pickup apparatus for converging a light flux onto an information recording plane of an optical information recording medium, comprising:

an optical path difference providing section having a function of providing an optical path difference, the optical path difference providing section being divided coaxially around an optical axis so as to form a plurality of ring-shaped zones each of which has a respective different thickness along the direction of the optical axis so that the optical path difference providing section makes the length of an optical path of a light ray having passed through a ring-shaped zone among the plurality of ring-shaped zones longer than the length of an optical path of a light ray having passed through a neighboring ring-shaped zone located next to an optical axis side of the ring-shaped zone by a length obtained by multiplying an operating reference wavelength with an integer; and a refracting section having a refracting function of optimizing a spherical aberration of a converged light spot of a light flux which has the operating reference wavelength $\lambda_0$ and is converged onto the information recording plane;

wherein the optical element converges an incident light flux having the operating reference wavelength $\lambda_0$ onto the information recording plane with almost no aberration, and the following formula is satisfied:

$$|\Delta f_B/(\lambda-\lambda_0)|<150$$

where $\Delta f_B$ is a distance along the direction of the optical axis between a converged light spot formed by an incident light flux having an operating wavelength 8 different from the operating reference wavelength $\lambda_0$ ($|\lambda-\lambda_0|<2$[nm]) and a converged light spot formed by an incident light flux having the operating reference wavelength $\lambda_0$, and wherein in each of the plurality of ring-shaped zones, the radius (mm) of the innermost peripheral section and the radius (mm) of the outermost peripheral section of each zone are determined such that a wavefront error at the converged light spot formed by the incident light flux having the operating wavelength $\lambda$ between a light ray having passed through the innermost peripheral section and a light ray having passed through the outermost peripheral section becomes $\Delta\Psi(\lambda)$, $$\Delta\Psi(\lambda)=\Psi(\lambda_0)(-1/\lambda_0+\delta/(n(\lambda_0)-1))\times(\lambda-\lambda_0)$$

$$=k(-1/\lambda_0+\delta/(n(\lambda_0)-1))\Delta\lambda$$

$$(\Delta\lambda=\lambda-\lambda_0, \delta=dn/d\lambda)$$

wherein $n(\lambda_0)$ is a refractive index, $\delta$ is a change of the refractive index due to variations of the wavelength, and k is an integer.

11. The optical element of claim 10, wherein the operating reference wavelength $\lambda_0$ satisfies the following formula:

$$400 \text{ nm} < \lambda_0 < 500. \text{ nm}.$$

12. The optical element of claim 10, wherein the number of ring-shaped zones formed on the first optical element is 20 to 60.

13. The optical element of claim 10, wherein the numerical aperture of the optical element is 0.9 or less.

14. The optical element of claim 10, wherein among the light flux, a distance between a position where a light ray having passed through at a position located farthest from the optical axis of the optical element intersects with the optical axis by the refracting function and a position where a paraxial ray intersects with the optical axis by the refracting function is 0.03 mm or less.

15. The optical element of claim 10, wherein the optical element is structured such that a divergent light flux comes to be incident into the optical element.

16. The optical element of claim 10, wherein the optical element comprises a compatible structure, converges a light flux having a wavelength $\lambda_0$ and having passed through the compatible structure on a condition capable of recording or reproducing a first optical information recording medium, and converges a light flux having a wavelength $\lambda_1$ ($\lambda_0<\lambda_1$) and having passed through the compatible structure on a condition capable of recording or reproducing a second optical information recording medium.

17. The optical element of claim 16, wherein the compatible structure is a diffractive structure.

18. The optical element of claim 16, wherein the compatible structure is structured such that a proceeding direction of a light ray is the same direction with a refracting direction by each of the plurality of ring-shaped zones and a phase $\Phi$ of a wavefront having passed through each of the plurality of ring-shaped zones satisfies the following formula at a position of an image plane where the wavefront aberration of a converged light spot becomes the minimum:

$$-0.5\pi \leq \Phi \leq 0.5\pi.$$

19. An optical pickup apparatus for converging a light flux on an information recording plane of an optical information recording medium, comprising:

a first optical element located on an optical axis of an optical system and having a function of providing an optical path difference, the first optical element being divided coaxially around an optical axis so as to form a plurality of ring-shaped zones each of which has a respective different thickness along the direction of the optical axis so that the first optical element makes the length of an optical path of a light ray having passed through a ring-shaped zone among the plurality of ring-shaped zones longer than the length of an optical path of a light ray having passed through a neighboring ring-shaped zone located next to an optical axis side of the ring-shaped zone by a length obtained by multiplying an operating reference wavelength $\lambda_0$ with an integer; and a second optical element having a ref racting function of optimizing a spherical aberration of a converged light spot of a light flux which has the operating reference wavelength $\lambda_0$ and is converged onto the information recording plane;

wherein the optical pickup apparatus converges an incident light flux having the operating reference wavelength $\lambda_0$ onto the information recording plane with almost no aberration, and corrects a paraxial chromatic aberration when a light flux having an operating wavelength $\lambda$ different from the operating reference wavelength $\lambda_0$ ($|\lambda-\lambda_0|<1$ [nm]) comes to be incident, and wherein in each of the plurality of ring-shared zones, the radius (mm) of the innermost peripheral section and the radius (mm) of the outermost peripheral section of each zone are determined such that a wavefront error at the converaed light spot formed by the incident light flux having the operating wavelength $\lambda$ between a light ray having passed throuah the innermost peripheral section and a light ray having passed through the outermost peripheral section becomes $\Delta\Psi(\lambda)$, $$\Delta 105 \,(\lambda)=\Psi(\lambda_0)(-1/\lambda_0+\delta/(n(\lambda_0)-1))\times(\lambda-\lambda_0)$$

$$=k(-1/\lambda_0+\delta/(n(\lambda_0)-1))\Delta\lambda$$

$$(\Delta\lambda=\lambda-\lambda_0, \delta=dn/d\lambda)$$

wherein $n(\lambda_0)$ is a refractive index, $\delta$ is a change of the refractive index due to variations of the wavelength, and k is an integer.

20. An optical pickup apparatus for converging a light flux onto an information recording plane of an optical information recording medium, comprising:

a first optical element having a function of providing an optical path difference, the first optical element being divided coaxially around an optical axis so as to form a plurality of ring-shaped zones each of which has a respective different thickness along the direction of the optical axis so that the first optical element providing section makes the length of an optical path of a light ray having passed through a ring-shaped zone among the plurality of ring-shaped zones longer than the length of an optical path of a light ray having passed through a neighboring ring-shaped zone located next to an optical axis side of the ring-shaped zone by a length obtained by multiplying an operating reference wavelength $\lambda_0$ with an integer; and a second optical element having a refracting function of optimizing a spherical aberration of a converged light spot of a light flux which has the operating reference wavelength $\lambda_0$ and is converged onto the information recording plane;

wherein the optical pickup apparatus converges an incident light flux having the operating reference wavelength $\lambda_0$ onto the information recording plane with almost no aberration, and the following formula is satisfied:

$$|\Delta f_B/(\lambda-\lambda_0)|<2000$$

where $\Delta f_B$ is a distance along the direction of the optical axis between a converged light spot formed by an incident light flux having an operating wavelength $\lambda$ different from the operating reference wavelength $\lambda_0$ ($|\lambda-\lambda_0|<1$[nm]) and a converged light spot formed by an incident light flux having the operating reference wavelength $\lambda_0$, and wherein in each of the plurality of ring-shaped zones, the radius (mm) of the innermost peripheral section and the radius (mm) of the outermost peripheral section of each zone are determined such that a wavefront error at the converged light spot formed by the incident light flux having the operating wavelenath $\lambda$ between a light ray having passed through the innermost peripheral section and a light ray having passed through the outermost peripheral section becomes $\Delta\Psi(\lambda)$, $$\Delta\Psi(\lambda)=\Psi(\lambda_0)(-1/\lambda_0+\delta/(n(\lambda_0)-1))\times(\lambda-\lambda_0)$$

$$=k(-1/\lambda_0+\delta/(n(\lambda_0)-1))\Delta\lambda$$

$$(\Delta\lambda=\lambda-\lambda_0, \delta=dn/d\lambda)$$

wherein $n(\lambda_0)$ is a refractive index, $\delta$ is a change of the refractive index due to variations of the wavelength, and k is an integer.

21. The optical pickup apparatus of claim 20, wherein the operating reference wavelength $\lambda_0$ satisfies the following formula:

$$600 \text{ nm}<\lambda_0<700 \text{ nm}.$$

22. The optical pickup apparatus of claim 20, wherein the number of ring-shaped zones formed on the first optical element is 3 to 30.

23. The optical pickup apparatus of claim 20, wherein the numerical aperture of the optical element is 0.65 or less.

24. The optical pickup apparatus of claim 20, wherein among the light flux, a distance between a position where a light ray having passed through at a position located farthest from the optical axis of the optical element intersects with the optical axis by the refracting function and a position where a paraxial ray intersects with the optical axis by the refracting function is 0.02 mm or less.

25. The optical pickup apparatus of claim 20, wherein the optical element is structured such that a divergent light flux comes to be incident into the optical element.

26. The optical pickup apparatus of claim 20, wherein the optical element comprises a compatible structure, converges a light flux having a wavelength $\lambda_0$ and having passed through the compatible structure on a condition capable of recording or reproducing a first optical information recording medium, and converges a light flux having a wavelength $\lambda_1$ ($\lambda_0<\lambda_1$) and having passed through the compatible structure on a condition capable of recording or reproducing a second optical information recording medium.

27. The optical pickup apparatus of claim 26, wherein the compatible structure is a diffractive structure.

28. The optical pickup apparatus of claim 26, wherein the compatible structure is structured such that a proceeding direction of a light ray is the same direction with a refracting direction by each of the plurality of ring-shaped zones and a phase $\Phi$ of a wavefront having passed through each of the plurality of ring-shaped zones satisfies the following formula at a position of an image plane where the wavefront aberration of a converged light spot becomes the minimum:

$$-0.5\pi \leq \Phi \leq 0.5\pi$$

29. An optical pickup apparatus for converging a light flux onto an information recording plane of an optical information recording medium, comprising:

a first optical element having a function of providing an optical path difference, the first optical element is divided coaxially around an optical axis so as to form a plurality of ring-shaped zones each of which has a respective different thickness along the direction of the optical axis so that the first optical element makes the length of an optical path of a light ray having passed through a ring-shaped zone among the plurality of ring-shaped zones longer than the length of an optical path of a light ray having passed through a neighboring ring-shaped zone located next to an optical axis side of the ring-shaped zone by a length obtained by multiplying an operating reference wavelength $\lambda_0$ with an integer; and a second optical element having a ref racting function of optimizing a spherical aberration of a converged light spot of a light flux which has the operating reference wavelength $\lambda_0$ and is converged onto the information recording plane;

wherein the optical pickup apparatus converges an incident light flux having the operating reference wavelength $\lambda_0$ onto the information recording plane with almost no aberration, and the following formula is satisfied:

$$|\Delta f_B/(\lambda-\lambda_0)|<150$$

where $\Delta f_B$ is a distance along the direction of the optical axis between a converged light spot formed by an incident light flux having an operating wavelength 8 different from the operating reference wavelength $\lambda_0$ ($|\lambda-\lambda_0|<2$[nm]) and a converged light spot formed by an incident light flux having the operating reference wavelength $\lambda_0$, and wherein in each of the plurality of ring-shaped zones, the radius (mm) of the innermost peripheral section and the radius (mm) of the outermost peripheral section of each zone are determined such that a wavefront error at the converged light spot formed by the incident light flux having the operating wavelength $\lambda$ between a light ray having passed through the innermost peripheral section and a light ray having passed through the outermost peripheral section becomes $\Delta\Psi(\lambda)$, $$\Delta\Psi(\lambda)=\Psi(\lambda_0)(-1/\lambda_0+\delta/(n(\lambda_0)-1))\times(\lambda-\lambda_0)$$

$$=k(-1/\lambda_0+\delta/(n(\lambda_0)-1))\Delta\lambda$$

$$(\Delta\lambda=\lambda-\lambda_0, \delta=dn/d\lambda)$$

wherein $n(\lambda_0)$ is a refractive index. $\delta$ is a change of the refractive index due to variations of the wavelength, and k is an integer.

30. The optical pickup apparatus of claim 29, wherein the operating reference wavelength $\lambda_0$ satisfies the following formula:

$$400 \text{ nm}<\lambda_0<500 \text{ nm}.$$

31. The optical pickup apparatus of claim 29, wherein the number of ring-shaped zones formed on the first optical element is 20 to 60.

32. The optical pickup apparatus of claim 29, wherein the numerical aperture of the optical element is 0.9 or less.

33. The optical pickup apparatus of claim 29, wherein among the light flux, a distance between a position where a light ray having passed through at a position located farthest from the optical axis of the optical element intersects with the optical axis by the refracting function and a position where a paraxial ray intersects with the optical axis by the refracting function is 0.03 mm or less.

34. The optical pickup apparatus of claim 29, wherein the optical element is structured such that a divergent light flux comes to be incident into the optical element.

35. The optical pickup apparatus of claim 29, wherein the optical element comprises a compatible structure, converges a light flux having a wavelength $\lambda_0$ and having passed through the compatible structure on a condition capable of recording or reproducing a first optical information recording medium, and converges a light flux having a wavelength $\lambda_1$ ($\lambda_0 < \lambda_1$) and having passed through the compatible structure on a condition capable of recording or reproducing a second optical information recording medium.

36. The optical pickup apparatus of claim 35, wherein the compatible structure is a diffractive structure.

37. The optical pickup apparatus of claim 35, wherein the compatible structure is structured such that a proceeding direction of a light ray is the same direction with a refracting direction by each of the plurality of ring-shaped zones and a phase c1 of a wavefront having passed through each of the plurality of ring-shaped zones satisfies the following formula at a position of an image plane where the wavefront aberration of a converged light spot becomes the minimum:

$$-0.5\pi \leqq \Phi \leqq 0.5\pi.$$

* * * * *